United States Patent
Winder et al.

(10) Patent No.: US 7,558,320 B2
(45) Date of Patent: Jul. 7, 2009

(54) QUALITY CONTROL IN FRAME INTERPOLATION WITH MOTION ANALYSIS

(75) Inventors: Simon Anthony John Winder, Seattle, WA (US); Jordi Ribas-Corbera, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 968 days.

(21) Appl. No.: 10/461,730

(22) Filed: Jun. 13, 2003

(65) Prior Publication Data
US 2004/0252759 A1  Dec. 16, 2004

(51) Int. Cl.
*H04B 1/66* (2006.01)

(52) U.S. Cl. .............. 375/240.12; 375/240.29; 375/240.16; 375/240.26; 348/699; 348/700; 382/260

(58) Field of Classification Search ........... 375/240.12, 375/240.29, 240.16, 240.26; 348/699, 700; 382/260
See application file for complete search history.

(56) References Cited

U.S. PATENT DOCUMENTS

| | | | |
|---|---|---|---|
| 5,473,379 A | 12/1995 | Horne | |
| 5,617,144 A | 4/1997 | Lee | |
| 5,657,087 A | 8/1997 | Jeong et al. | |
| 5,778,098 A | 7/1998 | Lee et al. | |
| RE35,910 E | 9/1998 | Nagata et al. | |
| 5,835,147 A * | 11/1998 | Florentin et al. | 375/240.12 |
| 5,929,902 A | 7/1999 | Kwok | |
| 5,933,535 A | 8/1999 | Lee et al. | |
| 5,970,173 A | 10/1999 | Lee et al. | |
| 6,008,852 A | 12/1999 | Nakaya | |
| 6,037,988 A * | 3/2000 | Gu et al. | 375/240.16 |
| 6,058,212 A | 5/2000 | Yokoyama | |
| 6,178,205 B1 | 1/2001 | Cheung et al. | |
| 6,215,496 B1 | 4/2001 | Szeliski et al. | |
| 6,369,835 B1 | 4/2002 | Lin | |
| 6,392,705 B1 | 5/2002 | Chaddha | |
| 6,400,831 B2 | 6/2002 | Lee et al. | |
| 6,546,188 B1 | 4/2003 | Ishii et al. | |
| 6,549,578 B1 * | 4/2003 | Maruya et al. | 375/240.23 |
| 6,594,313 B1 * | 7/2003 | Hazra et al. | 375/240.16 |
| 6,650,705 B1 | 11/2003 | Vetro et al. | |
| 6,707,854 B1 | 3/2004 | Bonnet et al. | |
| 6,728,317 B1 | 4/2004 | Demos | |
| 6,775,326 B2 | 8/2004 | Sekiguchi et al. | |
| 6,784,942 B2 * | 8/2004 | Selby et al. | 348/452 |

(Continued)

OTHER PUBLICATIONS

Ebrahimi, "MPEG-4 Video Verification Model: A Video Encoding/Decoding Algorithm Based on Content Representation," 30 pp. (1997).

(Continued)

*Primary Examiner*—Shawn An
(74) *Attorney, Agent, or Firm*—Klarquist Sparkman, LLP

(57) ABSTRACT

Techniques and tools for quality control in frame interpolation and motion analysis are described. The techniques and tools may be implemented separately or in combination in software and/or hardware devices for various applications. For example, a media playback device uses quality control in frame interpolation with motion analysis to increase the frame rate of streamed video for playback. The device selectively uses frame synthesis to increase frame rate and quality under normal circumstances, but avoids using frame synthesis when it would not provide suitable quality improvement. The device uses selective ghosting reduction and selective feathering to reduce artifacts in synthesized frames.

50 Claims, 17 Drawing Sheets

U.S. PATENT DOCUMENTS

| | | |
|---|---|---|
| 6,996,177 B1 | 2/2006 | Beuker |
| 7,068,720 B2 | 6/2006 | Wang et al. |
| 7,227,896 B2 * | 6/2007 | Sun .................. 375/240.16 |
| 2003/0138150 A1 | 7/2003 | Srinivasan et al. |
| 2003/0156646 A1 | 8/2003 | Hsu et al. |
| 2004/0001705 A1 | 1/2004 | Soupliotis et al. |
| 2005/0254584 A1 | 11/2005 | Kim et al. |

OTHER PUBLICATIONS

ISO/IEC, "ISO/IEC 11172-2, Information Technology—Coding of Moving Pictures and Associated Audio for Digital Storage Media at up to About 1.5Mbit/s—Part 2: Video," 112 pp. (1993).

ISO/IEC, "JTC1/SC29/WG11 N2202, Information Technology—Coding of Audio-Visual Objects: Visual, ISO/IEC 14496-2," 329 pp. (1998).

ITU-T, "ITU-T Recommendation H.261, Video Codec for Audiovisual Services at p x 64 kbits," 25 pp. (1993).

ITU-T, "ITU-T Recommendation H.262, Information Technology—Generic Coding of Moving Pictures and Associated Audio Information: Video," 205 pp. (1995).

ITU-T, "ITU-T Recommendation H.263, Video Coding for Low Bit Rate Communication," 162 pp. (1998).

"JPEG Image Coding Standard," 23 pp. [Downloaded from the World Wide Web on Feb. 23, 2004].

Sullivan et al., "The H.264/AVC Advanced Video Coding Standard: Overview and Introduction to the Fidelity Range Extensions," 21 pp. (Aug. 2004).

Wu et al., "Joint estimation of forward and backward motion vectors for interpolative prediction of video," *IEEE Transactions on Image Processing* 3(5):684-687, Sep. 1994.

Reader, "History of MPEG Video Compression—Ver. 4.0," 99 pp., document marked Dec. 16, 2003.

Anandan et al., "Hierarchical Model-Based Motion Estimation," Kluwer Academic Publishers, Boston, pp. 1-22 (1993).

Barron et al., "Performance of Optical Flow Techniques," *IJCV*, vol. 12, No. 1, pp. 43-77 (1994).

Beauchemin et al., "The Computation of Optical Flow," *ACM Computing Surveys*, vol. 27, No. 3, pp. 433-467 (1995).

Bugwadia et al., "Progressive-Scan Rate Up-Conversion of 24/30 Hz Source Materials for HDTV," *IEEE Transactions on Consumer Electronics*, vol. 42, No. 3, pp. 312-321 (1996).

Cafforio et al., "Motion Compensated Image Interpolation," *IEEE Transactions on Communication*, vol. 38, No. 2, pp. 215-222 (1990).

Chang et al., "Simultaneous Motion Estimation and Segmentation," *IEEE Transactions on Image Processing*, vol. 6, No. 9, pp. 1326-1333 (1997).

Efstratiadis et al., "Motion Field Prediction and Restoration for Low Bit-Rate Video Coding," *Proc. 2nd International Conference on Image Processing (ICIP 95)*, 4 pp. (Oct. 1995).

Ghosal et al., "A Fast Scalable Algorithm for Discontinuous Optical Flow Estimation," *IEEE Transactions on Pattern Analysis and Machine Intelligence*, vol. 18, No. 2, pp. 181-194 (1996).

Guleryuz, "Iterated Denoising for Image Recovery," *IEEE*, 10 pp. (marked Apr. 2002).

Hendriks et al., "Recursive Disparity Estimation Algorithm for Real Time Stereoscopic Video Applications," *IEEE International Conference on Image Processing*, pp. 891-894 (Sep. 1996).

Horn et al., "Determining Optical Flow," *Artificial Intelligence*, pp. 185-203 (1980).

Kim et al., "Local motion-adaptive interpolation technique based on block matching algorithms," *Signal Processing: Image Communication*, vol. 4, pp. 519-528 (1992).

Krishnamurthy et al., "Frame Interpolation and Bidirectional Prediction of Video using Compactly-Encoded Optical Flow Fields and Label Fields," *IEEE Transactions for Circuits and Systems for Video Technology*, 30 pp. (1996).

Lucas et al., "An Iterative Image Registration Technique with an Application to Stereo Vision," *Proceedings of Imaging Understanding Workshop*, pp. 121-130 (1981).

Martins, "Real-time Video Frame Rate Adaptation Based on Warping of Edge-Preserving Meshes," *ICIP*, pp. 948-952 (1999).

Morimoto et al., "Automatic Digital Image Stabilization," *Proc. of IEEE International Conference on Pattern Recognition*, Vienna, Austria, 6 pp. (Aug. 1996).

Ribas-Corbera et al., "Interframe Interpolation of Cinematic Sequences," *Journal of Visual Communication and Image Representation*, vol. 4, No. 4, pp. 392-406 (1993).

Shum et al., "Panoramic Image Mosaics," Technical Report MSR-TR-97-23, 53 pp.

Simoncelli, "Bayesian Multi-Scale Differential Optical Flow," *Differential Formulation*, pp. 397-422 (1998).

Stiller et al., "Estimating Motion in Image Sequences, A tutorial on modeling and computation of 2D motion," *IEEE Signal Processing*, 36 pp. (1999).

Thoma et al., "Motion Compensating Interpolation Considering Covered and Uncovered Background," *Signal Processing: Image Communication*, vol. 1, pp. 191-212 (1989).

Tubaro et al., "Motion Field Estimators and their Application to Image Interpolation," *Motion Analysis and Image Sequence Processing*, Kluwer Academic Publishers, Chapter 6, pp. 153-187 (1993).

Zhang et al., "Piecewise linear motion-adaptive interpolation," *Signal Processing: Image Communication*, vol. 4, pp. 93-99 (1991).

DynalPel Systems, Inc., materials downloaded from World Wide Web, 20 pp. (downloaded from World Wide Web on Feb. 18, 2005).

Avid Technology, Inc., materials downloaded from World Wide Web, 11 pp. (downloaded from World Wide Web on Feb. 18, 2005).

* cited by examiner

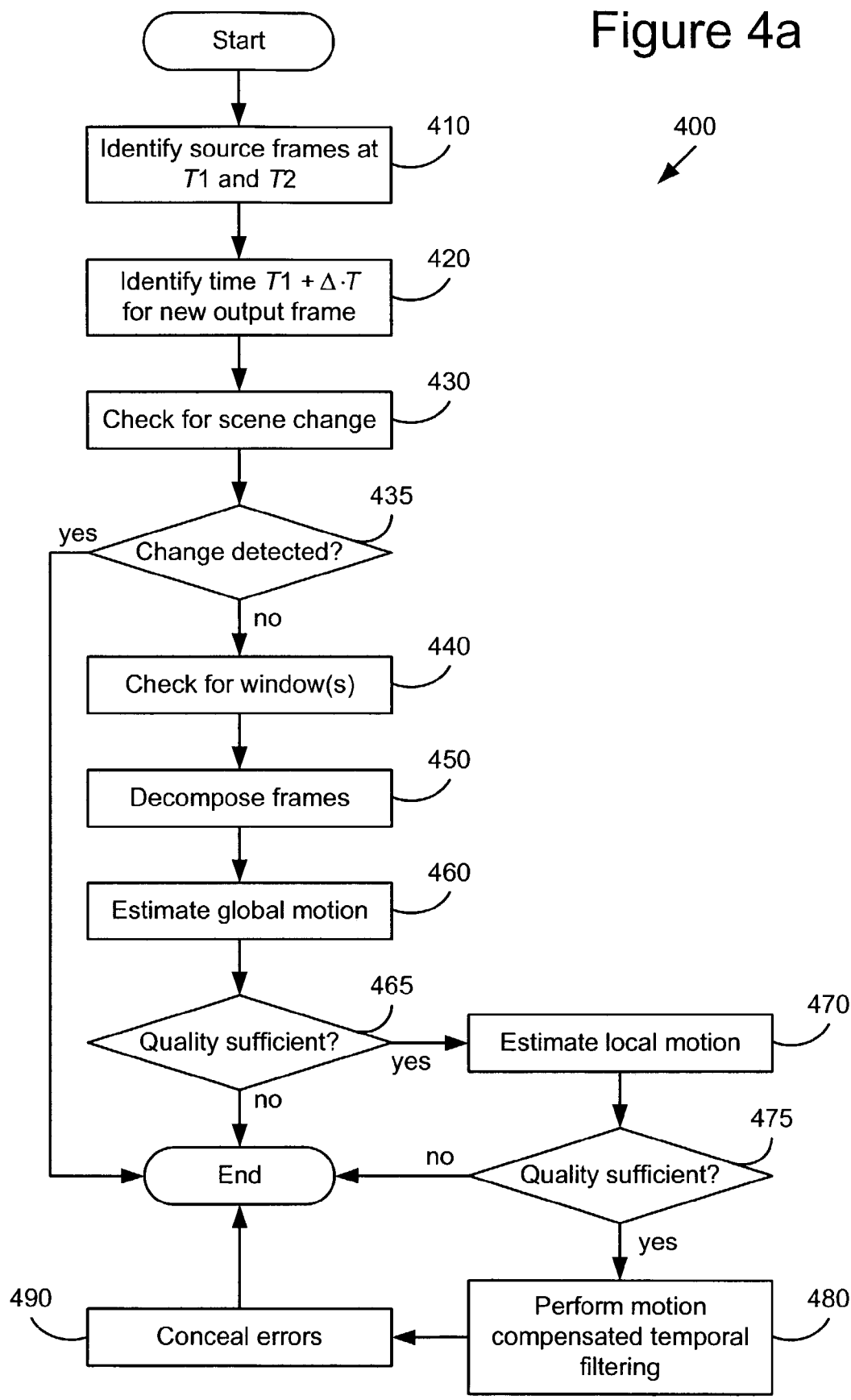

Scene Change Measure

```
if E_t > E_thresh1 then {
        frame_cut = 1
        Add frame cut to event list }
else
{
        if E_t > E_thresh2 and E_t > βC_t and E_t > ηE_{t-1} then {
            frame_cut = 1
            Add frame cut to event list }
        else {
            E_min = min[entropy of previous saved cuts]
            if E_t > E_thresh3 and E_t > γE_min then
                frame_cut = 1 }
}
```

600

1700 if $\text{Valid}(\Theta_F^{A+V} Y_{T1}(x,y))$ and $\text{Valid}(\Theta_B^{A+V} Y_{T2}(x,y))$
  MERGE_Y_WITH_FEATHER()
else if $\text{Valid}(\Theta_F^{A+V} Y_{T1}(x,y))$
  $Y(x,y) = \Theta_F^{A+V} Y_{T1}(x,y)$
else if $\text{Valid}(\Theta_B^{A+V} Y_{T2}(x,y))$
  $Y(x,y) = \Theta_B^{A+V} Y_{T2}(x,y)$
else
  MERGE_Y_FALLBACK()

Figure 17b

1701 if Valid $\left(\Theta_F^{A+V} U_{T1}(x,y)\right)$ and Valid $\left(\Theta_B^{A+V} U_{T2}(x,y)\right)$
    MERGE_UV()
else if Valid $\left(\Theta_F^{A+V} U_{T1}(x,y)\right)$ {
    $U(x,y) = \Theta_F^{A+V} U_{T1}(x,y)$
    $V(x,y) = \Theta_F^{A+V} V_{T1}(x,y)$ }
else if Valid $\left(\Theta_B^{A+V} U_{T2}(x,y)\right)$ {
    $U(x,y) = \Theta_B^{A+V} U_{T2}(x,y)$
    $V(x,y) = \Theta_B^{A+V} V_{T2}(x,y)$ }
else
    MERGE_UV_FALLBACK()

MERGE_Y_WITH_FEATHER() {
    $d = \left| \Theta_F^{A+V} Y_{T1}(x,y) - \Theta_B^{A+V} Y_{T2}(x,y) \right|$
    if $d < \theta_L$ then
        $\alpha = \Delta$
    else {
        $\Delta_S = \Delta > 0.5 \:?\: \Delta - 1 : \Delta$
        if $d > \theta_U$ then
            $\beta_i = \Delta_S$
        else
            $\beta_i = \Delta_S \cdot (d - \theta_L)/(\theta_U - \theta_L)$
        $\alpha = \Delta - \beta_i$ }
    if $q < 0.5$ then
        $m = 2q\alpha$
    else
        $m = 1 - 2(1-q)(1-\alpha)$
    $Y(x,y) = (1-m)\Theta_F^{A+V} Y_{T1}(x,y) + m \Theta_B^{A+V} Y_{T2}(x,y)$
}

Figure 19

1900

$midx = (L + R - 1)/2$ $midy = (T + B - 1)/2$ $fx_F = x_F < midx\,?\,x_F - L : R - x_F$ $fy_F = y_F < midy\,?\,y_F - T : B - y_F$ $feather_F = \min(fx_F, fy_F)$ $feather_F = \min(feather_F, 8)$ $feather_F = \max(feather_F, 1)$ $fx_B = x_B < midx\,?\,x_B - L : R - x_B$ $fy_B = y_B < midy\,?\,y_B - T : B - y_B$ $feather_B = \min(fx_B, fy_B)$ $feather_B = \min(feather_B, 8)$ $feather_B = \max(feather_B, 1)$ $q = feather_B / (feather_B + feather_F)$

Figure 20

2000

MERGE_Y_FALLBACK() {
    $d = |Y_{T1}(x,y) - Y_{T2}(x,y)|$
    if $d < \theta_L$ then
        $Y(x,y) = (1-\Delta) \cdot Y_{T1}(x,y) + \Delta \cdot Y_{T2}(x,y)$
    else {
        $\Delta_S = \Delta > 0.5\,?\,\Delta - 1 : \Delta$
        if $d > \theta_U$ then
            $\beta_i = \Delta_S$
        else
            $\beta_i = \Delta_S \cdot (d - \theta_L)/(\theta_U - \theta_L)$
        $Y(x,y) = (1 - \Delta + \beta_i) \cdot Y_{T1}(x,y) + (\Delta - \beta_i) \cdot Y_{T2}(x,y)$ }
}

QUALITY CONTROL IN FRAME INTERPOLATION WITH MOTION ANALYSIS

TECHNICAL FIELD

Techniques and tools for quality control in frame interpolation and motion analysis are described. For example, a playback device uses quality control in frame interpolation with motion analysis to improve quality when increasing the frame rate of streamed video for playback.

BACKGROUND

Streaming video over the Internet has become more popular, helped by the greater availability of on-line video content and the increased use of high-bandwidth connections with which to obtain the content. Providers of streaming video often use low frame rates (as well as small frame dimensions and low fidelity) to reduce bitrate and thus make viewing or downloading the video practicable, even for high-bandwidth connections. For example, streaming video often has a frame rate of 15 frames per second ["fps"] or slower. To viewers accustomed to television frame rates of 25 fps, 30 fps, or higher, the streaming video may appear jerky or choppy.

Outside of streaming video applications, it is sometimes necessary to convert video content from one frame rate to another for reasons unrelated to bandwidth limitations. Examples include converting from cinematic 24 fps content to the CCIR-601 video rates (telecine conversion), converting between PAL, NTSC and HDTV rates, and generating frames for slow motion playback.

Traditional methods of rate conversion have used frame or field repetition, such as the commonly used 3:2 pull-down method for telecine conversion. In these methods, the nearest source frame/field to the desired output time-stamp is displayed. For instance, in U.S. Pat. No. 5,929,902 to Kwok, a sequence of frames at 24 fps is converted to 60 fields per second video by producing three video fields for the first frame and two fields for the second frame, etc., with the fields alternating between odd and even frames. The first field produced could be an odd field from the first frame, the second an even field from the first frame, the third field an odd field from the first frame (identical to the first field), the fourth an even field from the second frame, the fifth an odd field from the second frame, and so on.

It is also possible to use simple temporal filtering to generate a new output frame at a correct time-stamp. This may suffice for low-motion video, but does not work as well if there is temporal aliasing of high spatial frequency components in the source sequence. Typically, low frame-rate video content contains plenty of temporal aliasing, and simple temporal filtering may produce obvious ghosting artifacts. Ghosting artifacts are an unintended result of blending two images. For example, when a foreground object and background at the same location in different frames are blended, a faint version of the foreground object may appear over the background where it should not. Such duplicate or out-of-place objects appear similar to those produced from the double exposure of still image film.

Motion compensated temporal filtering has been used to alleviate this problem. Matching regions from one source frame to another by motion estimation allows a new frame to be synthesized at an intermediate time by temporal filtering of the aligned and positioned source regions. Numerous techniques for motion compensated temporal filtering have been tried. The quality of the resulting frame is critically dependent on the accuracy of the motion estimation. For this reason, numerous approaches to motion estimation have been suggested. Whatever the merits of previous frame interpolation and motion analysis techniques, however, they do not have the advantages of the techniques and tools of the present invention.

SUMMARY

The present invention relates to techniques and tools for quality control in frame interpolation and motion analysis. For example, a playback device uses quality control in frame interpolation with motion analysis to improve quality when increasing the frame rate of streamed video for playback. More generally, the techniques and tools of the present invention may be implemented in other software and/or hardware devices for other applications.

The present invention includes a variety of aspects. The various aspects may be used separately and independently for quality control in motion analysis and/or frame interpolation. Or, the various aspects may be used in combination.

According to a first aspect, a tool such as a frame synthesizer selectively uses frame synthesis. For example, the tool determines whether frame synthesis is on or off after predicting the quality of the frame synthesis between two frames. Or, with the rest of the data for a video sequence, the tool receives a signal that indicates whether frame synthesis is on or off. If frame synthesis is on, the tool synthesizes an output frame using a normal mode such as frame interpolation with motion analysis. Otherwise, the tool synthesizes the output frame using a fallback mode such as simple averaging, or it skips synthesis of the output frame altogether. In this manner, the tool uses frame synthesis to increase frame rate and quality under normal circumstances, but avoids using frame synthesis when it would not provide suitable quality improvement.

According to a second aspect, a tool such as a frame synthesizer selectively reduces ghosting artifacts in a synthesized output frame. For example, the tool measures the difference between two pixel values from different frames, which are to be combined for a pixel in a synthesized output frame. If the pixel values are similar, they are evenly weighted in the combination. Otherwise, the pixel values are unevenly weighted in the combination, or only one pixel value is used. This reduces ghosting artifacts that are due to blending of dissimilar pixel values.

According to a third aspect, a tool such as a frame synthesizer selectively applies feathering in a synthesized output frame. For example, suppose that one area in the synthesized output frame is derived by combining pixel values from two frames after motion compensation, while an adjacent area is derived from a single one of the two frames. Feathering helps reduce visible boundary discontinuities between such areas.

These and other aspects of the present invention will become apparent from the following detailed description, which makes references to the accompanying drawings.

BRIEF DESCRIPTION OF THE DRAWINGS

FIG. 4a is a flowchart showing a technique for frame interpolation with motion analysis.

FIG. 16 is a diagram showing valid and invalid reference pixels for points in an intermediate frame.

FIGS. 17a and 17b are pseudocode listings for techniques for determining interpolation modes.

FIG. 18 is a pseudocode listing for a technique for pixel merging using both feathering and non-linear interpolation.

FIG. 19 is a pseudocode listing for a technique for deriving a feather factor used to obtain an output pixel.

FIG. 20 is a pseudocode listing for a technique for a fallback merging mode.

DETAILED DESCRIPTION

Figure 1:
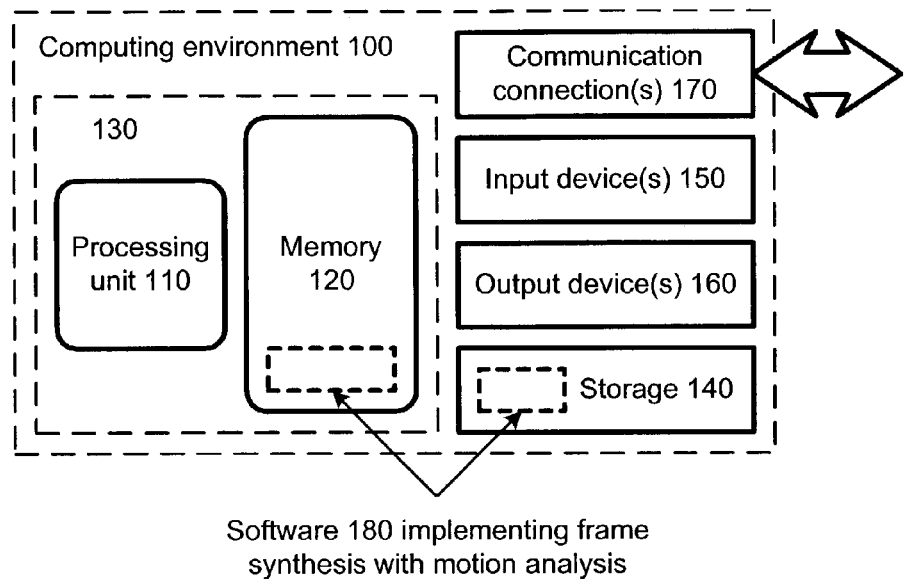
FIG. 1 is a block diagram of a suitable computing environment in which several described embodiments may be implemented.

Described embodiments relate to conversion of visual content from one rate to another. The described techniques and tools encompass computer software and hardware for analyzing and processing video in order to change the frame rate.

In a streaming video application, for example, a media playback device uses frame interpolation with motion analysis to change the playback frame rate of compressed on-line video content. Frame synthesis at the device generates one or more additional frames for a received source frame. This increases the final displayed frame rate, providing better subjective quality to the viewer without requiring a corresponding increase in the bitrate of the video stream. Moreover, the computational complexity of the frame synthesis is low enough that the media playback device may perform the synthesis on-the-fly and in real time as a post-processing step during playback.

More generally, the described techniques and tools may be implemented in other software and/or hardware devices for other applications. For example, in conjunction with non-streaming video playback, slow motion playback, rate conversion between standards, or another application, a computer temporally re-samples a video sequence by synthesizing new frames at any arbitrary time-stamp from adjacent source frames using motion compensated temporal filtering.

Throughout the specification and claims, unless the context clearly indicates otherwise (e.g., by describing video fields and video frames in the same passage), the term "frame" is used in a general sense. In that general sense, the term "frame" indicates and includes fields, frames, pictures, and other two-dimensional visual data along a dimension such as time. For example, if a described technique relates to processing of a video frame, the frame may be a video field, video frame in the strict sense (i.e., two fields), or other video picture. Aside from video, the frames may be, for example, geometric mesh samples in a time series or other sequence.

Without loss of generality, most of the following description shows examples of synthesis of a single frame at a point in time between source frames. The same synthesis may be used to generate any number of frames between the source frames.

A variety of motion analysis and frame interpolation techniques and tools are described herein, including techniques and tools for scene change detection, global optical flow based motion estimation, local optical flow based motion estimation (including vector switching), non-linear compensated filtering, and quality estimation and control. The various techniques and tools may be used separately and independently for motion analysis and/or frame interpolation. Or, the various techniques and tools may be used in combination. For the sake of presentation, much of the following description shows the operations of a "frame synthesizer" that performs the techniques in combination. The frame synthesizer is a tool with software and/or hardware components, for example, media playback software.

The frame synthesizer may use frame interpolation with global and local motion analysis to assemble new frames in which the motion trajectories of objects appear smooth across interpolated frames. This addresses numerous problems in frame synthesis by providing among other things: 1) fast global motion estimation; 2) improved quality of local motion estimation; 3) error calculation to avoid the display of bad frames; and 4) error concealment in synthesized frames.

A first problem in frame synthesis relates to the speed and accuracy of motion estimation. To construct frames at intermediate times between source frames, the motion field that maps one source frame into another should be analyzed in detail. With the field, it is possible to synthesize the intermediate frames by projecting pixel data partway along appropriate motion paths between the source frames. For this to work well, the motion field should be spatially dense and accurate, which is very difficult and computationally complex to accomplish.

The frame synthesizer addresses the first problem by breaking motion estimation into a stage of global motion estimation followed by a stage of local motion estimation. Traditional global motion estimation requires expensive computation at every point in the image and may be fooled by non-global motion in the scene. The frame synthesizer focuses computation on parts of the source frames that are likely to be relevant, which improves accuracy and reduces complexity at the same time. In particular, for global motion estimation, the frame synthesizer: (a) rejects significant non-global motions; (b) de-emphasizes contributions from the frame center (because correct global camera motion is more often associated with regions away from the object on which the camera is focused); and (c) emphasizes pixels that contain significant features (rather than any and all pixels).

For local motion estimation, the frame synthesizer produces vectors that are positioned at spatial and temporal locations appropriate to simple synthesis of an interpolated frame. In particular, the frame synthesizer uses a Laplacian pyramid approach. At a given pyramid level, warping consists of warping the past reference frame forward in time, and warping the future reference frame backward in time, using the global motion information. Local motion is then estimated at that level as a correction to the global motion information. Thus, local motion vectors are maintained at the correct spatiotemporal location appropriate for generating a synthesized frame.

A second problem in frame synthesis relates to the quality of local motion estimation. Following conventional optical flow methods, to compute a dense motion vector field, a Laplacian pyramid is used along with warping to refine progressively the resolution of motion vector estimates. This does not work well at motion flow discontinuities because the estimation process at finer levels does not recover from poor vectors inherited from coarser levels. Specifically, under this scheme, strong foreground motions tend to spill out spatially onto the background.

The frame synthesizer addresses the second problem by using vector switching, in which the frame synthesizer compares a) the error resulting from use of vectors inherited from coarser estimation levels with b) the error resulting from use of vectors generated at the current level in isolation. The frame synthesizer uses an appropriate error-based criterion to decide which vectors to use.

A third problem in frame synthesis relates to quality control for synthesized frames. Because it is not always possible to obtain accurate motion fields, there may be a significant quality reduction for some scenes. Generating a quality measure that relates well to the user's subjective quality is difficult.

The frame synthesizer addresses the third problem by calculating an error measure that accurately indicates the quality of a synthesized frame. When the quality measure is too low, the frame synthesizer avoids presenting the frame to the user. In particular, the frame synthesizer computes quality measures in several ways. First, the frame synthesizer computes a quality measure in the global motion estimation stage. Second, when the frame synthesizer computes a candidate motion field, the frame synthesizer computes a vector variance measure and compares it against a threshold. These measures help ensure that bad frames are rejected.

A fourth problem in frame synthesis relates to error concealment in synthesized frames. Synthesis of a frame by combining appropriately warped past and future reference frames can produce ghosting effects in cases of occlusion or of failure of the motion estimation.

The frame synthesizer addresses the fourth problem by using a local technique to conceal ghosting artifacts. The error between a forward-warped past frame and a backward-warped future frame is used to switch smoothly between two ways of combining these two warped frames. If the error is small, weighted temporal filtering is used to combine the frames. If the error is large, just one of the warped frames is used, depending on the desired time stamp for the new frame. For intermediate error values, a combination of the two estimates is used. In addition, the frame synthesizer uses "feathering" to combine frames when making an interpolated frame. This reduces artifacts at the seams between pixel data that comes from the two frames.

I. Computing Environment

FIG. 1 illustrates a generalized example of a suitable computing environment (100) in which several of the described embodiments may be implemented. The computing environment (100) is not intended to suggest any limitation as to scope of use or functionality, as the techniques and tools may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory, etc.), or some combination of the two. The memory (120) stores software (180) implementing frame synthesis with motion analysis.

A computing environment may have additional features. For example, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and includes magnetic disks, magnetic tapes or cassettes, CD-ROMs, DVDs, or any other medium which can be used to store information and which can be accessed within the computing environment (100). The storage (140) stores instructions for the software (180) implementing the frame synthesis with motion analysis.

The input device(s) (150) may be a touch input device such as a keyboard, mouse, pen, or trackball, a voice input device, a scanning device, or another device that provides input to the computing environment (100). For audio or video processing, the input device(s) (150) may be a sound card, video card, TV tuner card, or similar device that accepts audio or video input in analog or digital form, or a CD-ROM, CD-RW, DVD, or similar device that reads audio or video samples into the computing environment (100). The output device(s) (160) may be a display, printer, speaker, CD-writer, or another device that provides output from the computing environment (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (100), computer-readable media include memory (120), storage (140), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "estimate," "signal," and "determine" to describe computer operations in a computing environment. These terms are high-level abstractions for operations performed by a computer, and should not be confused with acts performed by a human being. The actual computer operations corresponding to these terms vary depending on implementation.

II. Overview: Video Streaming Applications

To reduce bitrate, streaming video providers typically reduce the frame rate of video before streaming. When played back, the video appears choppy as a result.

To counter this problem, a media playback device synthesizes video frames for a stream of compressed video data streamed over the Internet. The device receives a stream for a compressed video sequence with a low frame rate, synthesizes additional frames, and plays back the video sequence at a high frame rate. Thus, the device increases the playback frame rate without requiring a corresponding increase in the bitrate of the streamed video. At the same time, the synthesis is computationally simple enough to be used in inexpensive media playback devices, used with higher resolution/fidelity frames, or used concurrently with other, more complex processing.

Alternatively, a streaming video provider may exploit client-side frame synthesis capability to improve overall quality. Without changing the overall bitrate of a video sequence, a provider may reduce the frame rate of the sequence and correspondingly increase the frame resolution or frame quality. The provider delivers higher quality frames to the playback device and relies on the playback device to increase the frame rate for playback. For example, instead of encoding a video sequence at 30 fps with medium quality, the provider encodes the sequence at 10 fps with high quality and relies on the playback device to increase the frame rate to 30 fps. This works especially well with low-motion video content.

Figure 2:
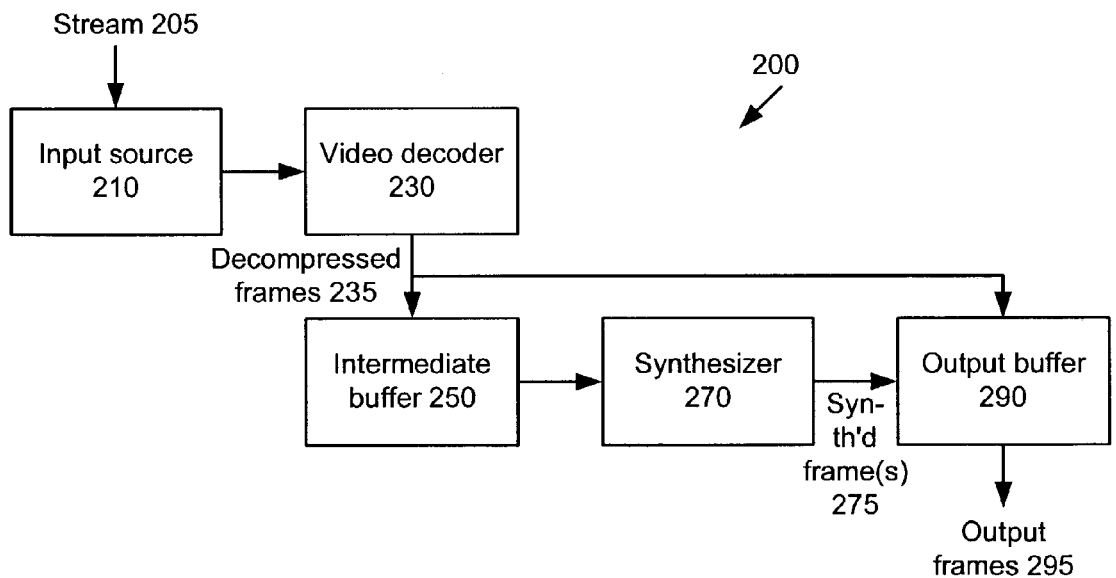
FIG. 2 is a block diagram showing a media playback device that synthesizes video frames for real-time playback in a video streaming application.

FIG. 2 shows a media playback device (200) that synthesizes video frames for real-time playback in a video streaming application. The device (200) includes an input source (210), a video decoder (230), a frame synthesizer (270), and multiple buffers (250, 290). Alternatively, the device (200) includes other and/or additional components.

The input source (210) receives the stream (205) of compressed video data from a network connection. The input source (210) includes one or more buffers at communications layers and/or the application layer to compensate for fluctuations in the bandwidth of the network connection and/or the bitrate of the stream. The input source (210) provides compressed video data to the video decoder (230).

The video decoder (230) decompresses the compressed video data and outputs decompressed source video frames (235) to the intermediate buffer (250). The components of the video decoder (230) can vary depending on the compression desired. U.S. patent application Ser. No. 10/378,988, filed Mar. 3, 2003, entitled "FADING ESTIMATION/COMPENSATION" and U.S. patent application Ser. No. 10/322,171, filed Dec. 17, 2002, entitled "SPATIAL EXTRAPOLATION OF PIXEL VALUES IN INTRAFRAME VIDEO CODING AND DECODING," each of which is hereby incorporated by reference, describe components of example video decoders. The intermediate buffer (250) stores two or more source video frames (235) for synthesis.

For pairs of source video frames in the video sequence, the frame synthesizer (270) generates additional video frames (275) by frame interpolation with motion analysis. For example, between the first and second source video frames, the frame synthesizer (270) generates one or more additional video frames (275) using techniques described below. The frame synthesizer (270) later generates one or more additional video frames (275) between the second and third source video frames, etc.

The device (200) selects the number of frames (275) to be synthesized between a pair of source frames. The number of frames (zero or more) may depend on a) the processing capacity of the device (200) (including the processor type and/or the number of available processing cycles), b) characteristics of the video data such as frame rate or quality, and/or c) other criteria. For example, if the frame rate is less than or equal to 10 fps, the frame synthesizer adds two intermediate frames between each pair of source frames. If the frame rate is greater than 10 fps but less than or equal to 20 fps, the frame synthesizer adds one intermediate frame between each pair of source frames. And, if the frame rate is greater than 20 fps, the frame synthesizer skips frame synthesis. Alternatively, the device (200) always synthesizes the same number of frames (275) between a pair of source frames or adaptively enables/disables other frame synthesis options.

Instead of or in addition to selection in the device (200), the streaming video provider may select the number of frames (275) and signal the number in the stream of video data. Alternatively, the streaming video provider may simply insert one or more "on"/"off" bits into the stream of video data to indicate whether frame synthesis should or should not be performed on a single frame or sequence of frames. This allows the provider to determine in advance which sections of a video sequence will use frame synthesis, so the provider can selectively disable the frame synthesis when it is not likely to work well. For example, the bits or number may be signaled at the frame level in the bitstream, allowing a provider to disable frame synthesis for batches of high motion frames. Alternatively, the bits or number can be signaled at another level (e.g., sequence) in the bitstream.

The frame synthesis increases the final displayed frame rate, providing better quality without a corresponding increase in bitrate. Moreover, the computational complexity of the frame synthesis is low enough that the media playback device (200) may perform the synthesis on-the-fly and in real time as a post-processing step during playback. The frame synthesizer (270) outputs frames (295) to an output buffer (290), which stores the frames (295) for playback.

III. Overview: Selective Use of Frame Synthesis with Motion Analysis

Under some circumstances, frame synthesis may be undesirable. For example, frame synthesis may not provide suitable quality when interpolating frames in scenes with extreme motion. In such scenes, the subjective and objective quality may actually be better if frame synthesis is skipped. In other cases, the quality may be improved for a frame or area of a frame if a fallback mode (such as simple weighted averaging) is used instead of frame synthesis with motion analysis.

Figure 3B:
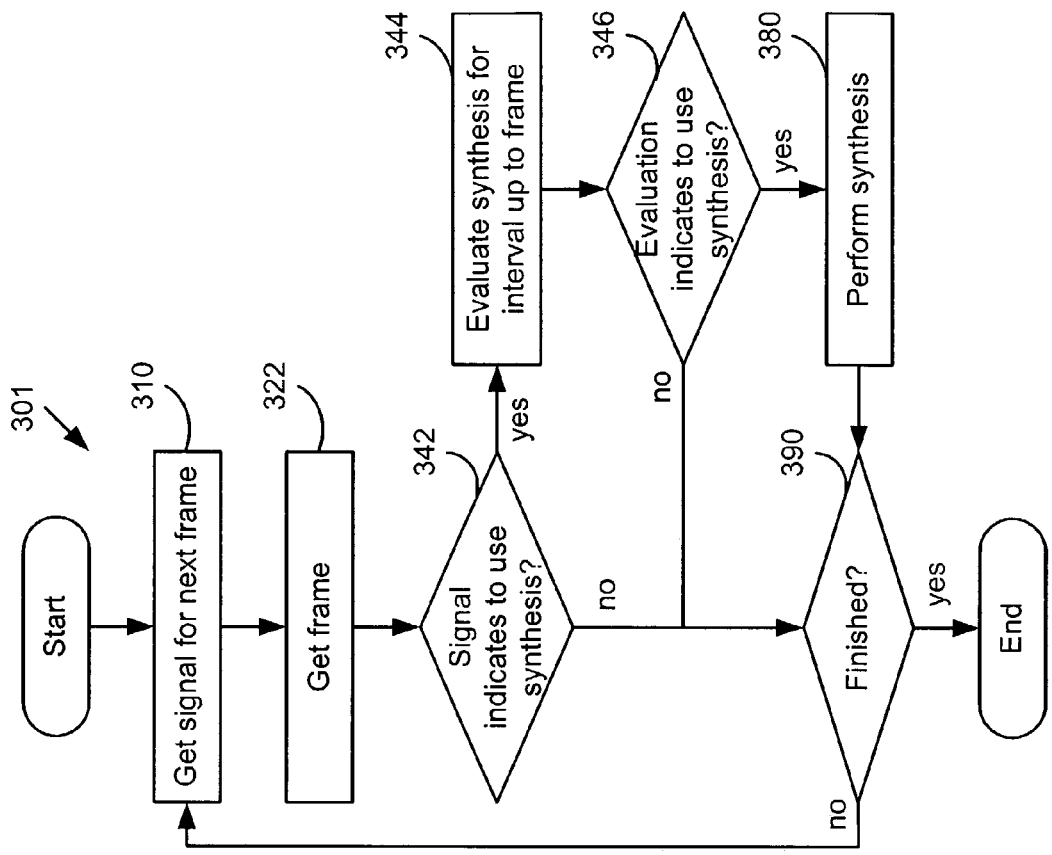
FIGS. 3a and 3b are flowcharts showing techniques for selective use of frame synthesis.
Figure 3A:
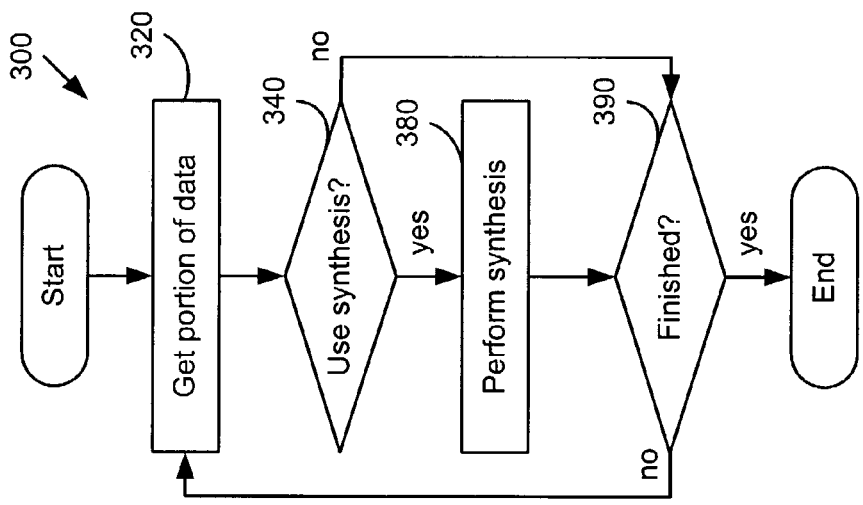

To address these different situations, a frame synthesizer selectively uses frame synthesis with motion analysis. Several criteria for selection, including characteristics of the data and signaling from a provider, are described above. Other criteria, including quality control, are described below. This section summarizes various criteria and techniques for selective frame synthesis. FIG. 3a shows a generalized technique (300) for selective use of frame synthesis, and FIG. 3b shows a more detailed technique (300) using signaling at the frame level as well as subsequent evaluation of synthesis.

With reference to FIG. 3a, a frame synthesizer gets (320) a portion of data. For example, the frame synthesizer gets one or more decompressed video frames. Alternatively, the frame synthesizer gets another portion of data.

The frame synthesizer then determines (340) whether or not to use synthesis. This determination may be based upon a) a signal from the provider with respect to the portion or sequence including the portion, b) characteristics of the portion of data such as frame rate or quality, c) prediction of the quality of synthesis for the portion of data, and/or d) other criteria.

If the frame synthesizer determines synthesis should be performed, it performs (380) the synthesis. Otherwise, the frame synthesizer determines (390) whether to finish or continue by getting (320) the next portion of data. The frame synthesizer may also have one or more fallback modes (not shown) if normal synthesis is not used.

With reference to FIG. 3b, a frame synthesizer gets (310) a signal for a frame that indicates whether synthesis should be used for the interval up to the frame. The signal allows a provider to selectively disable the synthesis when it is not likely to work well. The frame synthesizer then gets (322) the frame. Alternatively, the frame synthesizer gets a signal at some other level in the bitstream, gets more or less data, and/or gets a signal that indicates a synthesis mode.

The frame synthesizer then determines (342), based upon the signal, whether or not to use synthesis. If so, the frame synthesizer evaluates (344) synthesis for the interval up to the frame it got. For example, the frame synthesizer evaluates characteristics affecting synthesis for the interval or frame, and/or it evaluates the expected or actual quality of synthesis for the interval, which may help prevent excessive display of artifacts when inter-frame displacement is high or significant occlusions are present in the interval.

The frame synthesizer then determines (346), based upon the evaluation, whether or not to use synthesis. If so, the frame synthesizer performs (380) the synthesis.

If the frame synthesizer determines not to use synthesis, the frame synthesizer determines (390) whether to finish or continue by getting (310) the signal for the next frame. The frame synthesizer may also have one or more fallback modes (not shown) if normal synthesis is not used.

Although FIG. 3b shows signaling and evaluation (of content, synthesis, etc.) in combination, the frame synthesizer may instead use signaling or evaluation alone.

IV. Overview: Frame Interpolation with Hierarchical Motion Analysis

A frame synthesizer performs frame rate conversion of progressive-scan content as part of client-side post-processing. This section describes the overall process used by a frame synthesizer (402). Later sections detail specific stages of the process, which may be used together or individually, and with other and/or additional stages not shown.

The overall process provides sufficient subjective quality over a large selection of video content. The process uses hierarchical optical flow techniques, and there will always be cases where no matching is possible between source regions because of occlusions. Because of this, the algorithm combines highly accurate motion estimation with the use of a quality measure in order to prevent excessive display of artifacts when inter-frame displacement is high and significant occlusions are present.

Figure 4B:
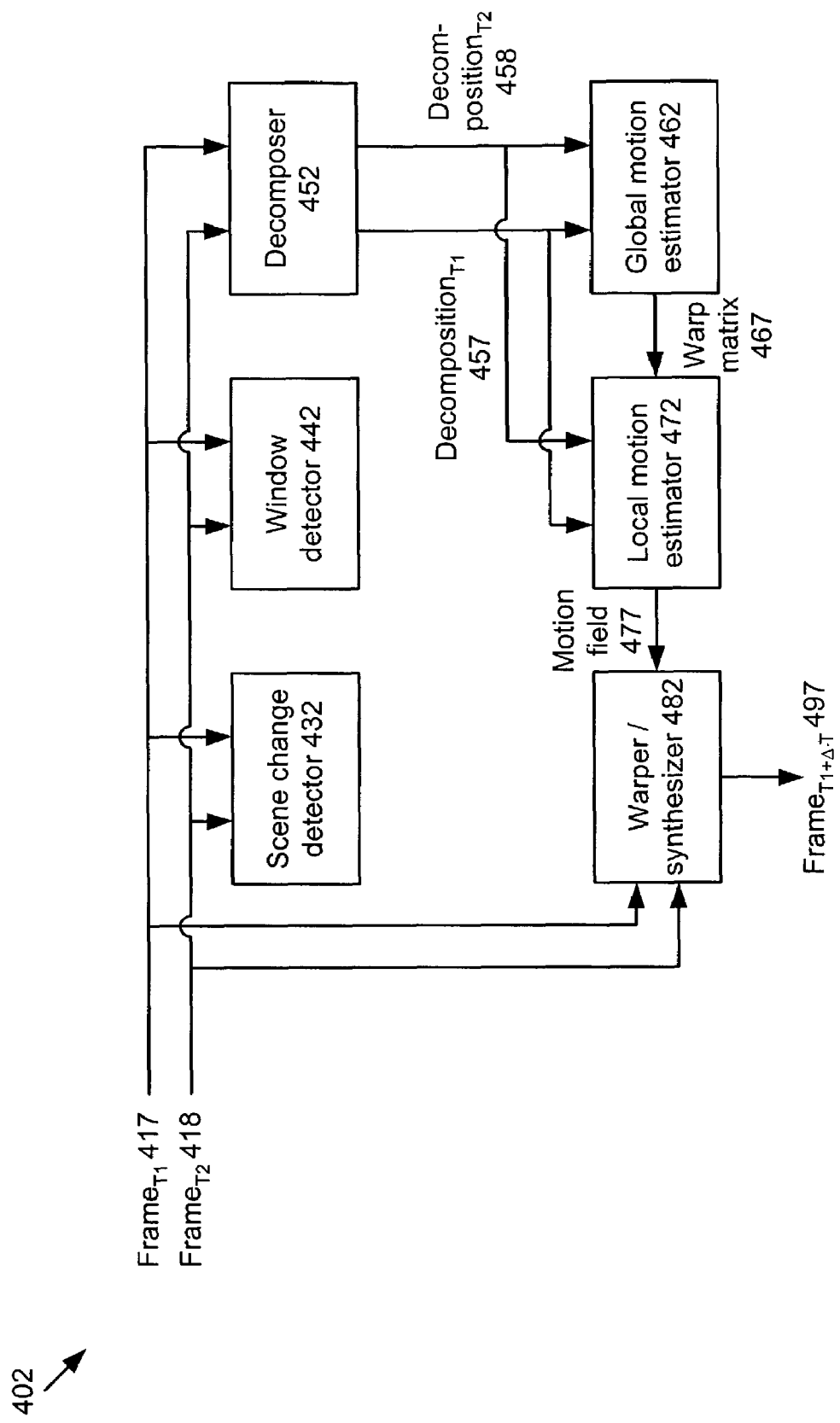
FIG. 4b is a corresponding block diagram showing components of a frame synthesizer.

FIG. 4a shows the overall technique (400) used by the frame synthesizer (402). FIG. 4b is a corresponding diagram showing the components of the frame synthesizer (402). Alternatively, the frame synthesizer (402) includes other and/or additional components.

The technique (400) operates on a pair of source frames and generates a number of output frames (one output frame shown) at specified timestamps. The technique (400) uses a single source interval, which reduces complexity and avoids additional buffering delay. Alternatively, a longer source interval (including more source frames) is used.

The frame synthesizer (402) identifies (410) a pair of video frames that are input—a source frame at time T1 (frame$_{T1}$ 417) and a source frame at time T2 (frame$_{T2}$ 418). For each pair of video frames input to the process, one or more frames can be produced at any time part way in between the source frames. So, the frame synthesizer also identifies (420) a time T1+Δ·T between T1 and T2 for a new output frame to be synthesized. T is the interval between T1 and T2 (i.e., T2-T1), and the symbol Δ is a fraction that indicates the desired output frame timing. One frame is generated with Δ=0.5 for frame rate doubling, two frames are generated with Δ=0.333 and Δ=0.667 for frame rate tripling, etc.

The scene change detector (432) next checks (430) for a scene change between the two source frames (417, 418). In general, the purpose of the scene change detector (432) is to detect frame intervals in which interpolation should not be attempted because the second frame is not closely enough related to the first frame, in terms of content. For example, the scene change detector (432) uses a color histogram difference measure that peaks at scene changes. Alternatively, the scene change detector (432) uses other and/or addition scene change criteria.

When a scene change is detected (435), rather than use frame interpolation, the frame synthesizer (402) may simply repeat the source frame that is closest to the required output time stamp. The scene change detector (432) detects mainly abrupt scene changes—the frame synthesizer (402) handles fade transitions sufficiently well by using later motion compensated filtering.

If no scene change is detected (435), the window detector (442) checks (440) for windows for the frame interval between the source frames (417, 418). Video content is commonly windowed in some way such that there is an inactive region of the frame. For example, this happens when widescreen movies are letterboxed for 4:3 aspect displays. In addition, many capture processes generate inactive solid black vertical or horizontal edges to the frame that can be a few pixels wide. During camera panning, zooming and other motion, the inactive region may act as a motion discontinuity, causing problems for global or local motion estimation and leading to interpolation artifacts. The purpose of window detection is to determine if such an inactive border region is present for the frame interval. If an inactive border region is detected, the frame synthesizer (402) performs motion estimation and interpolation only within the active region. For pixels outside the window, the frame synthesizer (402) uses simple temporal filtering between the source frames (417,

418) without motion compensation. The results of the window detection may effect which pixels will be taken as input by the pyramid decomposer (452).

Before motion estimation, the decomposer (452) decomposes (450) the source frames (417, 418). This produces decompositions (457, 458) of the respective source frames (417, 418). The decomposition converts the source frames (417, 418) into a format that facilitates subsequent hierarchical analysis. For example, the pyramid decomposition is Laplacian pyramid decomposition. Alternatively, the decomposer (452) uses another form of decomposition.

The global motion estimator (462) estimates (460) the overall change in position of pixels between the source frames (417, 418), producing a warping matrix (467). The purpose of the global motion estimation is to find the global transformation that best maps the first to the second source frame. The global motion estimation provides a regularized base for local motion estimation, and it can cleanly handle global image motion such as panning or zooming. For example, as described in detail below, the global motion estimator (462) uses a coarse-to-fine iterative estimation technique (starting with a translational model) to compute a set of six affine parameters, which should provide the best affine map from the source frame at time T2 (418) onto the source frame at time T1 (417), in a global sense. Alternatively, the global motion estimator (462) estimates (460) global motion using a different motion model.

The frame synthesizer (402) checks (465) whether the quality of the global motion estimation is sufficient. If not, the technique (400) ends. If so, the technique (400) continues with local motion estimation. Global motion estimation may be insufficient when the frame interval contains multiple motions or extreme differential displacements. When the frame synthesizer (402) detects that interpolation would yield poor results, the frame synthesizer (402) may fall back to simple linear temporal filtering by weighted averaging.

The quality control system of the frame synthesizer (402) of FIG. 4*b*, which helps the frame synthesizer (402) avoid conspicuous artifacts during interpolation, is distributed. For example, the local motion estimator (472) also checks motion quality for synthesized frames and employs a fallback mode if output quality is predicted to be below a certain level. Further, when a provider can turn synthesis on or off at the frame level or other level, the provider can perform quality control. Alternatively, the frame synthesizer (402) includes a dedicated quality control component.

Using the decompositions (457, 458) and the warping matrix (467), the local motion estimator (472) estimates (470) motion centered at the time T1+Δ·T, producing a motion field (477). For a pixel or block of pixels, a vector represents a correction to the global transformation when the pixel or block of pixels is advanced forward (from time T1) or regressed backward (from time T2) to the time T1+Δ·T. The motion field (477) is used to form the intermediate frame from the two source frames (417, 418).

For example, the local motion estimator (472) creates a vector for each pixel or block of pixels (e.g., a 2×2 or 4×4 block depending on frame size) within the frames. The global estimation parameters for a source frame interval are the starting point for the local motion estimation. The local motion estimator (472) uses an optical-flow constraint equation to provide a high-resolution motion field in a coarse-to-fine framework, using Laplacian pyramid decomposition together with re-warping. The local motion estimator (472) uses a vector switching technique to choose the starting point for estimation at the next spatial scale, which helps to reduce problems at motion discontinuities. The frame synthesizer (402) repeats local motion estimation for each new output frame, generating vectors that are specific to a particular frame time.

The frame synthesizer (402) then checks (475) whether the quality of the local motion estimation is sufficient. If not, the technique (400) ends. If so, the technique (400) continues with motion compensation and filtering. For example, the frame synthesizer (402) checks the variance of differential motion vectors about the global flow. Alternatively, the frame synthesizer (402) uses other metrics or checks at other stages. As with global motion estimation, local motion estimation may be insufficient when the frame interval contains multiple motions or extreme differential displacements, and when the frame synthesizer (402) detects that interpolation would yield poor results, the frame synthesizer (402) may fall back to simple linear temporal filtering.

The global motion estimator (462) and local motion estimator (472) estimate motion using the luminance channel of the source frames in a luminance/chrominance format. Alternatively, the estimators also use the chrominance channels or operate upon source frames in a different color format.

The warper/synthesizer (482) performs (480) motion-compensated temporal filtering between the source video frames (417, 418). First, a motion vector field is created by modifying the warping matrix (467) according to the motion field (477). The warper uses the motion vector field to warp the source video frames (417, 418) toward the intermediate time T1+Δ·T for the frame to be synthesized. The source reference frame at time T1 (417) is warped forward, and the source reference frame at time T2 (418) is warped backward, along the directions indicated by the motion vectors.

The two resulting candidate frames are synthesized together to form the final interpolated frame. In general, valid pixels in the two warped frames are combined to give the pixels in the output frame. Pixels are combined using a non-linear temporal filtering process, which helps prevent ghosted regions appearing during occlusions, as would be the case if linear filtering were used.

The warper/synthesizer (482) also conceals (490) errors using a variety of techniques. These help prevent visual artifacts should the motion match be poor. In addition, a final error measure may be computed and checked so as to temporarily disable the frame interpolation process in the case that the resulting frame would be sub-standard.

V. Scene Change Detection

Scene change detection helps identify and screen out frame intervals in which frame interpolation should not be attempted. Typically, interpolation between frames is only desirable if the second frame is a continuation in time of the same content as the first frame. Performing frame interpolation across a scene change can easily result in ghosting artifacts in the synthesized frames.

The frame synthesizer checks for a scene change between two frames by constructing a color histogram for each frame, then calculating a difference measure based on the cross entropy of the distributions. For instance, for a source frame in YUV 4:2:0 format with 8-bit pixels, the frame synthesizer constructs a luminance histogram and a 2D chrominance histogram using normalization and range clipping. The normalized chroma values U* and V* are given by:

$$U^* = H_{scale}(U-128)/(Y+Y_{min}) \quad (1), \text{ and}$$

$$V^* = H_{scale}(V-128)/(Y+Y_{min}) \quad (2),$$

where $H_{scale}$ is a scaled one dimensional histogram. These values are then range clipped and histogrammed in two dimensions using a 31×31 table. The scale factor is set so that the color distribution for typical scenes fills the majority of the histogram area. Additionally the Y component is histogrammed using a 256-entry table.

In order to detect changes in the color distribution from the frame at T1 to the frame at T2, the cross entropy measure $E_{UV}$ is computed:

$$E_{UV} = \sum_{UV} (H_{T2} - H_{T1}) \log\left(\frac{H_{T2}+1}{H_{T1}+1}\right). \quad (3)$$

The frame synthesizer then computes a combined and normalized cross entropy measure $E_{norm}$ from the Y and UV histograms:

$$E_{norm} = \frac{kE_{UV} + E_Y}{wh}, \quad (4)$$

where the calculation of $E_Y$ is similar to $E_{UV}$, the frame has dimensions w×h, and the constant k emphasizes the contribution from the chrominance measure.

Figures 5, 6:
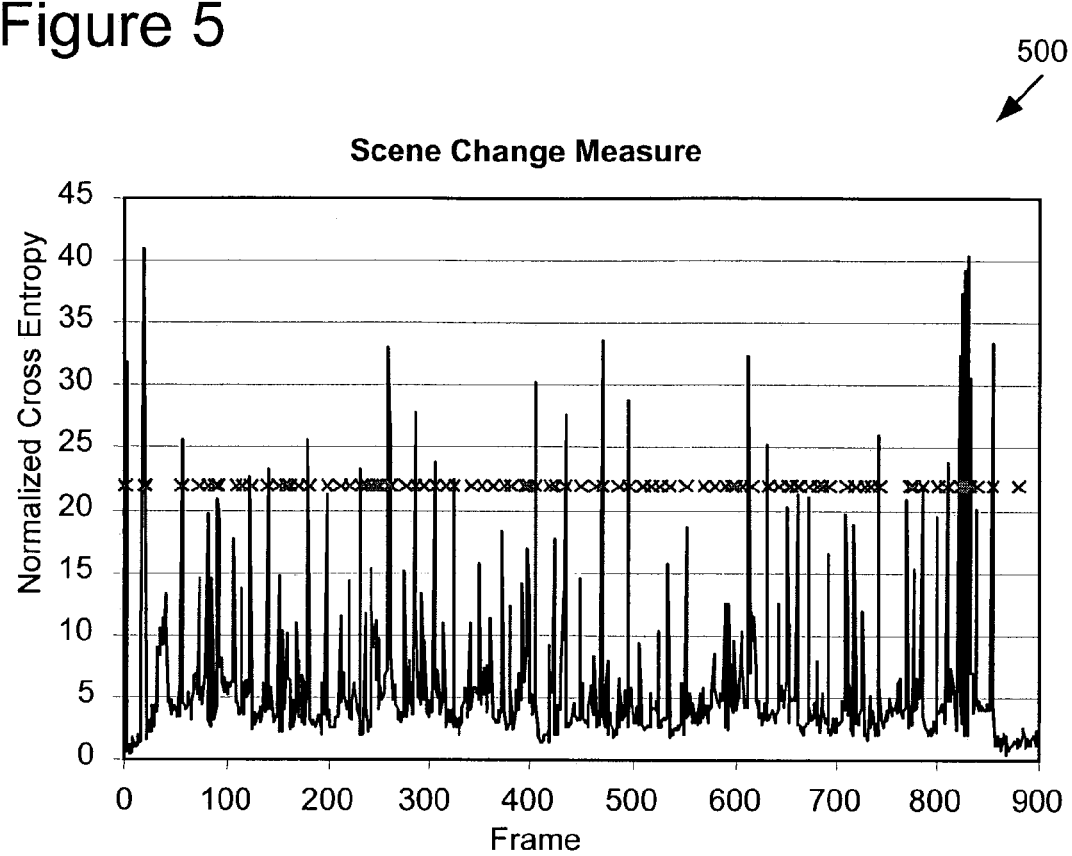
FIG. 5 is a graph showing the response of the cross entropy measure for a video sequence containing multiple, rapid scene changes.
FIG. 6 is a pseudocode listing for a technique for checking for a scene change in an interval.

FIG. 5 shows the response of the cross entropy measure for a video sequence containing multiple, rapid scene changes. The cross entropy measure is highly peaked when a scene change occurs. In the graph (500), each "x" indicates the occurrence of a true scene change over an interval.

It is often difficult to detect the peaks reliably, minimizing false positives, without requiring information about future frames at each moment. To address this problem, the frame synthesizer uses a technique that detects a sudden rise in the signal above an adaptively-set background level. The frame synthesizer maintains a filtered version of the entropy measure using an IIR filter:

$$C_{t+1} = \alpha C_t + (1-\alpha) E_t, \quad (5),$$

where $\alpha$ is a constant explained below and $E_t$ is the entropy of the current interval. For reference, the frame synthesizer also keeps a list of previous scene changes in the previous N frames as well as the entropy measures associated with these scene changes. The frame synthesizer then checks for a scene change in the current interval as shown in the pseudocode listing (600) in FIG. 6. In general, a scene change (i.e., frame cut) is detected if a) the current interval entropy $E_t$ is greater than an absolute primary entropy threshold $E_{thresh1}$, or b) the current interval entropy $E_t$ satisfies various adaptive, secondary conditions. If a scene change is detected, the frame synthesizer adds it to the list of scene changes and records the entropy of the interval for use in future scene change detection. The values of the constants shown in the pseudocode listing (600) are implementation dependent. In one implementation, they have the values: $E_{thresh1}=12$, $E_{thresh2}=0.75$, $E_{thresh3}=0.25$, $\alpha=0.7$, $\beta=2.5$, $\gamma=0.75$, $\eta=3.0$ and N=10.

For the difficult sequence whose cross entropy graph (500) is shown in FIG. 5, the technique shown in the pseudocode listing (600) of FIG. 6 correctly found 73 scene cuts out of 97. It also generated 15 false positives—typically due to sudden large changes in scene content that were not truly scene cuts. Missed changes occurred when the two source frames had a very similar color balance, such as a change to a slightly different viewpoint on the same scene.

Alternatively, the frame synthesizer user other and/or additional techniques for scene change detection, or skips scene change detection entirely.

VI. Window Detection

Window detection is used to frame the active area of the video image so as to reduce artifacts when video content has one or more static borders. Video content may have one or more static borders, for example, when a wide screen movie is letterboxed (with top and bottom black bands) for a particular aspect ratio, when a video encoder adds lines of black pixels to reach an allowed frame size, or when the video content includes a static graphic overlay. These borders can produce problems during global or local motion estimation leading to interpolation (e.g., ghosting) artifacts.

Figure 7A:
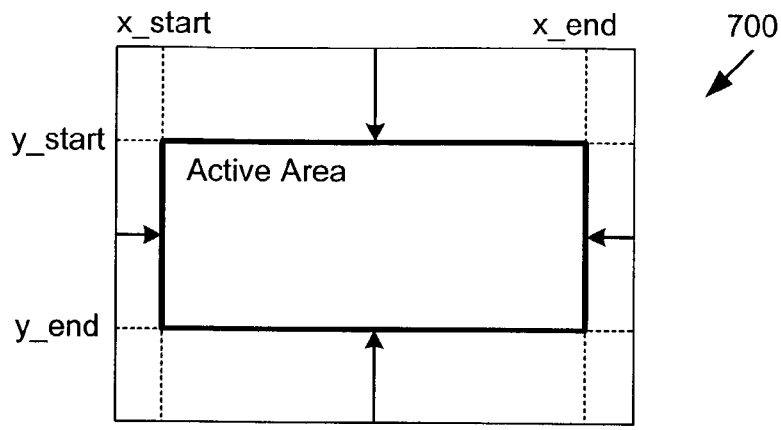
FIG. 7a is a diagram of a frame with an inactive border area surrounding an active area.
Figure 7B:
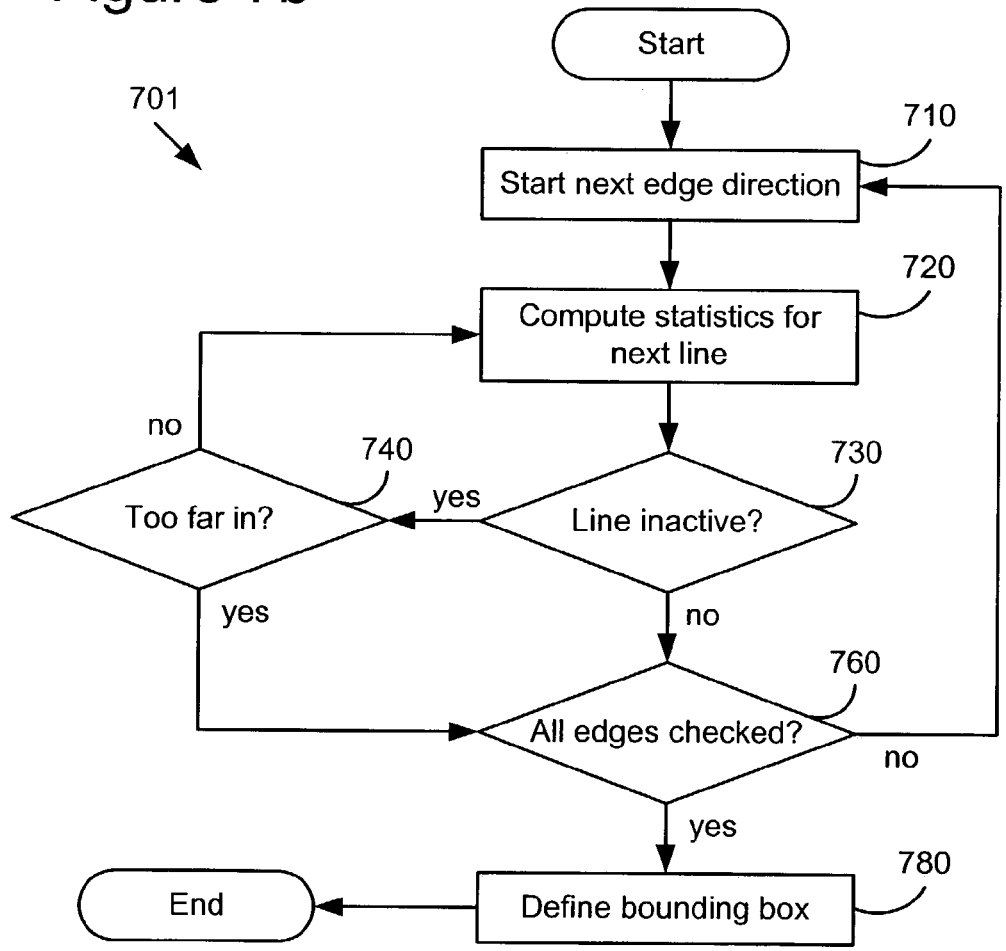
FIG. 7b is a flowchart showing a technique for detecting the active area.

The frame synthesizer checks for a border around video content by scanning inwards along the rows and columns of each frame. To check whether an edge row or column is part of a black border area, the frame synthesizer uses image statistics for the luminance of the edge row or column to decide if it is part of the black border area. FIG. 7a shows a frame (700) with an active area surrounded on all sides by an inactive border area. Overall, the frame synthesizer scans in the direction of the arrows to obtain the coordinates of the bounding box of the active area: x_start, x_end, y_start, and y_end. FIG. 7b shows a technique (701) for detecting the active area in the frame. Generally, for each edge of the frame (700), the frame synthesizer starts with the line on the edge of the frame (700), checks whether the line is part of the border region, and, if so, continues with the next line inward.

With reference to FIGS. 7a and b, the frame synthesizer starts (710) with the next edge direction of the frame (700) to be tested. For example, the frame synthesizer starts by scanning downward from the top row of the frame (700) to obtain the first active luminance row. The frame synthesizer computes (720) statistics for the next line (e.g., row). To detect black border edge lines in one implementation, the statistics are mean luminance $Y_{mean}$, the variance $Y_{variance}$ of the luminance, and the maximum luminance $Y_{max}$.

The frame synthesizer determines (730) whether the line is inactive (i.e., part of the inactive, border region). For example, the frame synthesizer compares the computed statistics to threshold values. In the windows detection implementation described above, the frame synthesizer compares the computed luminance statistics to corresponding thresholds. A line is judged to be part of the active area if $Y_{mean} > \Psi_1$ or $Y_{variance} > \Psi_2$ or $Y_{max} > \Psi_3$. The values of the thresholds are implementation dependent, for example, $\Psi_1=40$, $\Psi_2=400$, and $\Psi_3=50$.

If the line is judged to be part of the inactive, border area, the frame synthesizer determines (740) whether the inward scanning has already gone too far into the frame (700). In one implementation, the frame synthesizer stops inward scanning when ⅓ of the frame height (or width) is reached, if scanning has not already stopped before then. If scanning continues, the frame synthesizer computes (720) statistics for the next line inward in the same direction.

The frame synthesizer stops scanning inward in a particular direction if an active (e.g., non-black) line is detected. The frame synthesizer then determines (760) whether all four edges of the frame have been checked. If there are additional edges to be checked, the frame synthesizer starts (710) the next edge direction.

If all four edges of the frame (700) have been checked, the frame synthesizer defines (780) a bounding box for the active area in the frame (700) based upon the positions of the detected active lines in the frame (700).

Alternatively, the frame synthesizer computes additional and/or different statistics, uses additional and/or different thresholds, uses a different technique for window detection (for example, to detect border areas other than monochromatic border areas), or skips window detection entirely.

VII. Decomposition of Source Frames

The frame synthesizer decomposes source video frames, which facilitates subsequent hierarchical analysis. For example, in global and local motion estimation, the frame synthesizer finds a large-scale match by starting at coarse resolution. The frame synthesizer then refines the match at progressively finer resolutions. Starting at a coarse resolution can also help detect motions that would otherwise be outside of a search window.

The frame synthesizer uses Laplacian pyramid decomposition, which is chosen because it reduces the sensitivity of the optical flow algorithm to changes in lighting between frames. In a Laplacian pyramid, intermediate levels essentially represent edges and details in the frame, rather than absolute luminance values.

In the Laplacian pyramid decomposition, the luminance component of a source frame is repeatedly filtered and down-sampled by a factor of two through L decomposition levels, until a desired low-resolution representation is obtained at the "apex" of the pyramid. Also, prior to constructing the pyramid, an additional stage is used to resample the source frame into the base of the pyramid. This is done for two reasons: 1) each level of the pyramid should have dimensions that are a multiple of $2^L$ (whereas the source frame can be of any size); and 2) motion vectors will be computed at a lower resolution than the original luminance sampling grid to offset computational complexity.

The source frame pixels $Y[x, y]$ are filtered and down-sampled into the pyramid base $P_0[x,y]$ with symmetrical extension according to:

$$P_0[x, y] = \sum_{j=0}^{2S} \sum_{k=0}^{2S} Y[R_{symx}(\lambda x - j + S), R_{symy}(\lambda y - k + S)]g[j]g[k], \quad (6)$$

where $\lambda$ is the sub-sampling factor, and $2S+1$ is the length of the filter kernel $g[x]$. $R_x$ and $R_y$ are functions that implement symmetrical extension according to:

$$R_{symx}(x) = \begin{cases} x < B_L : 2B_L - x \\ B_L \leq x < B_R : x \\ x \geq B_R : 2B_R - 2 - x \end{cases}, \text{ and} \quad (7)$$

$$R_{symy}(x) = \begin{cases} x < B_T : 2B_T - x \\ B_T \leq x < B_B : x \\ x \geq B_B : 2B_B - 2 - x \end{cases}, \quad (8)$$

where $\{B_L, B_T, B_R, B_B\}$ is the bounding box of the frame at the original resolution. The frame synthesizer uses the following approximately Gaussian filter kernels $g[x]$:

$$\lambda=2, S=3: g[x]=\{5,14,28,34,28,14,5\}/128 \quad (9), \text{ and}$$

$$\lambda=4, S=7: g[x]=\{1,2,4,7,10,14,17,18,17,14,10,7,4,2,1\}/128 \quad (10).$$

Once the base level $P_0[x, y]$ of the pyramid is obtained, the frame synthesizer computes the full pyramid by repetitive down-sampling and filtering according to:

$$P_{n+1}[x, y] = \quad (11)$$
$$\sum_{j=0}^{4} \sum_{k=0}^{4} P_n[R_{clipx}(2x - j + 2), R_{clipy}(2y - k + 2)]f_d[j]f_d[k],$$

where:

$$R_{clip}(x) = \begin{cases} x < 0 : 0 \\ 0 \leq x < N : x \\ x \geq N : N - 1 \end{cases}, \quad (12)$$

and N is appropriately the width or height of pyramid level $P_n$. The filter kernel $f_d[x]$ is given by:

$$f_d[x]=\{1,4,6,4,1\}/16 \quad (13).$$

The preceding decomposition results in a Gaussian pyramid, so the frame synthesizer uses upsampling and subtraction to produce a Laplacian pyramid:

$$L_{n-1}[x, y] = P_{n-1}[x, y] - \quad (14)$$
$$\sum_{\substack{j=x-2 \\ j \text{ even}}}^{x+2} \sum_{\substack{k=y-2 \\ k \text{ even}}}^{y+2} P_n\left[R_{clipx}\left(\frac{j}{2}\right), R_{clipy}\left(\frac{k}{2}\right)\right]f_u[x - j + 2]f_u[y - k + 2],$$

where:

$$f_u[x]=\{1,4,6,4,1\}/8 \quad (15).$$

The number of pyramid levels depends on the size of the source frame. In one implementation, the apex of the pyramid is constrained to have dimensions that are greater than 5×5. Motion vectors are later computed at the resolution of the pyramid base, which may be ½, ¼, or another fraction of the resolution of the source frame.

Alternatively, the frame synthesizer uses Gaussian pyramid decomposition, another form of coarse-to-fine decomposition, or no decomposition at all.

VIII. Global Motion Estimation

The frame synthesizer performs global motion estimation to estimate overall motion such as camera panning and zooming from frame to frame. The frame synthesizer later produces a local differential correction to the global motion estimation. By first using global motion estimation, the frame synthesizer reduces the range of the later local motion estimation.

A. Selecting Features and/or Regions

Traditionally, global motion estimation is slow and expensive in terms of resources because of the large amount of computation necessary at every point in the frame. Additionally, traditional global motion is often disrupted by local motion, which causes the global motion estimate to be inaccurate. In many video scenarios, the camera follows a target of interest as it moves past a stationary background. This results in scenes where the center of the image contains a fairly static region, and the remainder contains a moving background for which the global model provides a good motion approximation. Global motion estimation can be improved by rejecting outliers caused by the foreground and by fitting the background motion as closely as possible. To simultaneously improve the accuracy and speed of the global motion estimation, the frame synthesizer selectively emphasizes certain features or regions in the source frames. The purpose of the selection is to identify features or regions that reliably indicate uniform motion. So, the frame synthesizer de-emphasizes regions with local motion and focuses instead on image points most indicative of global motion. By selecting a subset of points to use in the global motion estimation, the frame synthesizer reduces computational complexity and increases the reliability of the estimation.

Figure 8B:
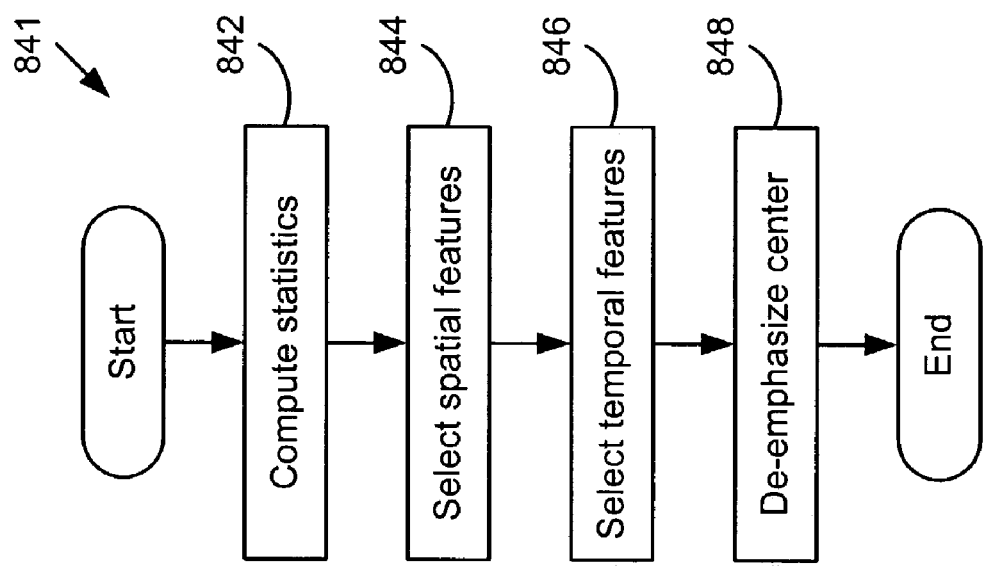
FIG. 8b is a flowchart detailing one selective emphasis technique.
Figure 8A:
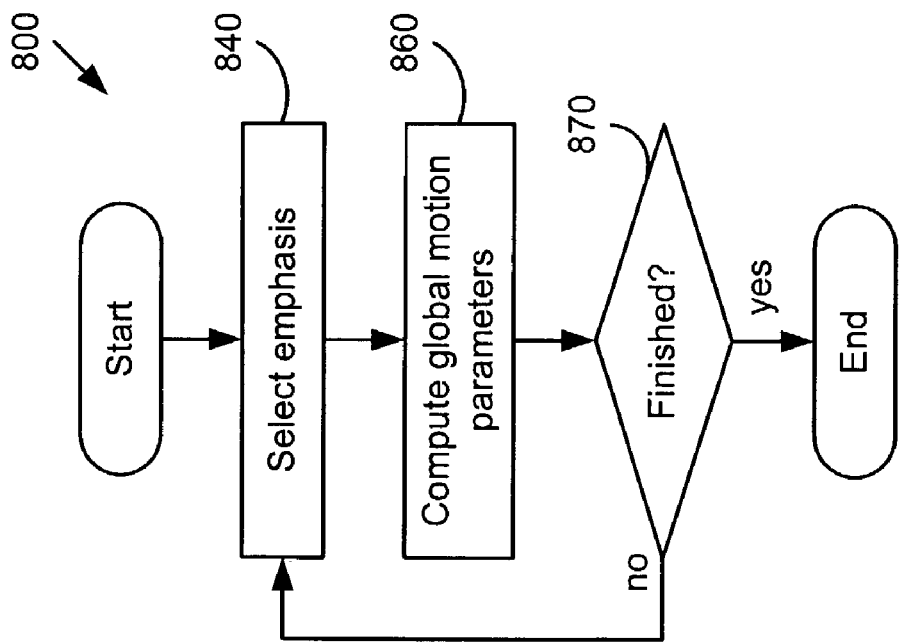
FIG. 8a is a flowchart showing a technique for global motion estimation with selective emphasis of features and/or regions.

FIG. 8a shows a technique (800) for global motion estimation with selective emphasis of features and/or regions. FIG. 8b shows additional detail for emphasis selection according to one technique (841).

The frame synthesizer selects (840) features and/or regions in the source frames to emphasize in global motion estimation. For example (as detailed in the technique (841) of FIG. 8b), the frame synthesizer computes (842) statistics (e.g., histograms) for points in the source frames. From the histograms or other statistics, the frame synthesizer selects (844) spatial features such as edges or other discontinuities within the individual source frames, and selects (846) temporal features such as discontinuities between the source frames. The frame synthesizer also de-emphasizes (848) image points toward the center of the frame to reduce their contribution to the global motion estimation. (Center pixels are more likely than other pixels to relate to a foreground object and hence not strongly exhibit global motion such as panning or zooming.) In an implementation described below, the frame synthesizer uses histogram analysis of spatial and temporal derivatives to select spatial and temporal features, and the frame synthesizer scales down values near the center of the frame. Alternatively, the frame synthesizer selects other and/or additional features or regions for emphasis, or uses other selection techniques. For example, the frame synthesizer uses more detailed motion analysis to identify and exclude points that deviate from consensus motion.

The frame synthesizer then iteratively computes (860) global motion parameters for the motion between the source frames, determines (870) whether estimation is finished, and, if not, adjusts the selection (840) of the emphasis. In this manner, the frame synthesizer iteratively converges on the global motion parameters, finishing when the global motion parameters have converged to a particular precision or a maximum number of iterations is reached.

In the implementation described below, the frame synthesizer uses emphasis selection during iterative refinement of affine parameters. Alternatively, the frame synthesizer uses emphasis selection at other and/or additional stages (e.g., during translational matching) or performs global motion estimation in one pass.

B. Overview of Hierarchical Affine Estimation

The frame synthesizer computes affine transformations between pairs of source frames. An affine mapping transforms the frame at time T1 into the frame at time T2 such that an error measure is minimized. Overall, an affine warping matrix W is used to transfer a coordinate from frame at time T1 into the frame at time T2 using homogeneous coordinates. The backward warping equation that finds the location in the first frame that maps to a designated location in the second frame can be written:

$$x_{T1} \sim W x_{T2} = \begin{bmatrix} w_1 & w_2 & w_3 \\ w_4 & w_5 & w_6 \\ 0 & 0 & 1 \end{bmatrix} \begin{bmatrix} x_{T2} \\ y_{T2} \\ 1 \end{bmatrix}, \quad (16)$$

where $\sim$ indicates equality up to scale. This equation can be rewritten as:

$$x_{T1} = w_1 x_{T2} + w_2 y_{T2} + w_3 \quad (17), \text{ and}$$

$$y_{T1} = w_4 x_{T2} + w_5 y_{T2} + w_6 \quad (18).$$

The frame synthesizer uses a multi-stage approach to produce global warping parameters. In summary, the frame synthesizer first initialize the affine warping matrix W using correlation on pyramid level 2. It then refines the translation parameters by iterating on level 2, then level 1. Lastly it estimates the full affine parameters by iterating on levels 2, then 1, then 0. Each iteration involves re-warping a level of the pyramid for the frame at time T1 ($L_{T1}$) towards the level of the pyramid for the frame at time T2 ($L_{T2}$), followed by parameter estimation and then a test for convergence of the parameters to obtain an early exit from the iteration loop. The translational elements of W ($w_3$ and $w_6$) are rescaled appropriately when shifting between pyramid levels. In addition, the frame synthesizer uses emphasis selection during the affine refinement.

Figure 9A:
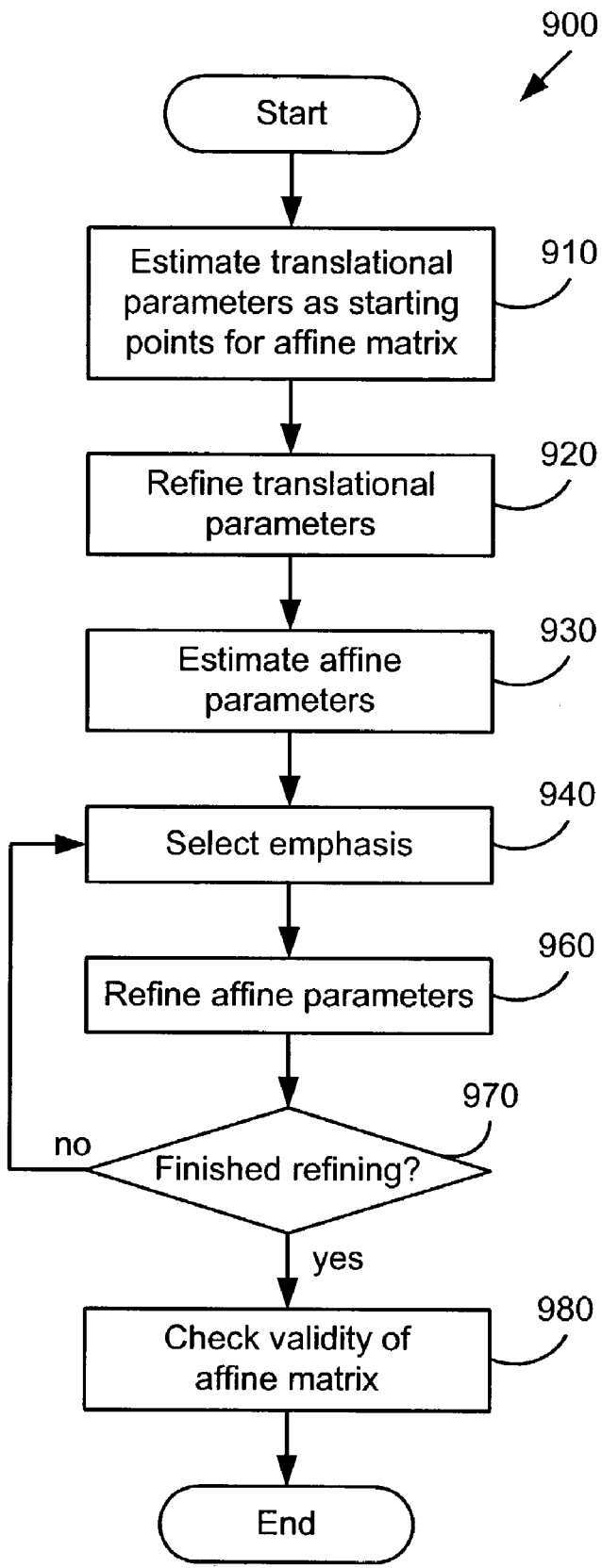
FIG. 9a is a flowchart showing a technique for hierarchical affine motion estimation with selective emphasis of features and/or regions.
Figure 9B:
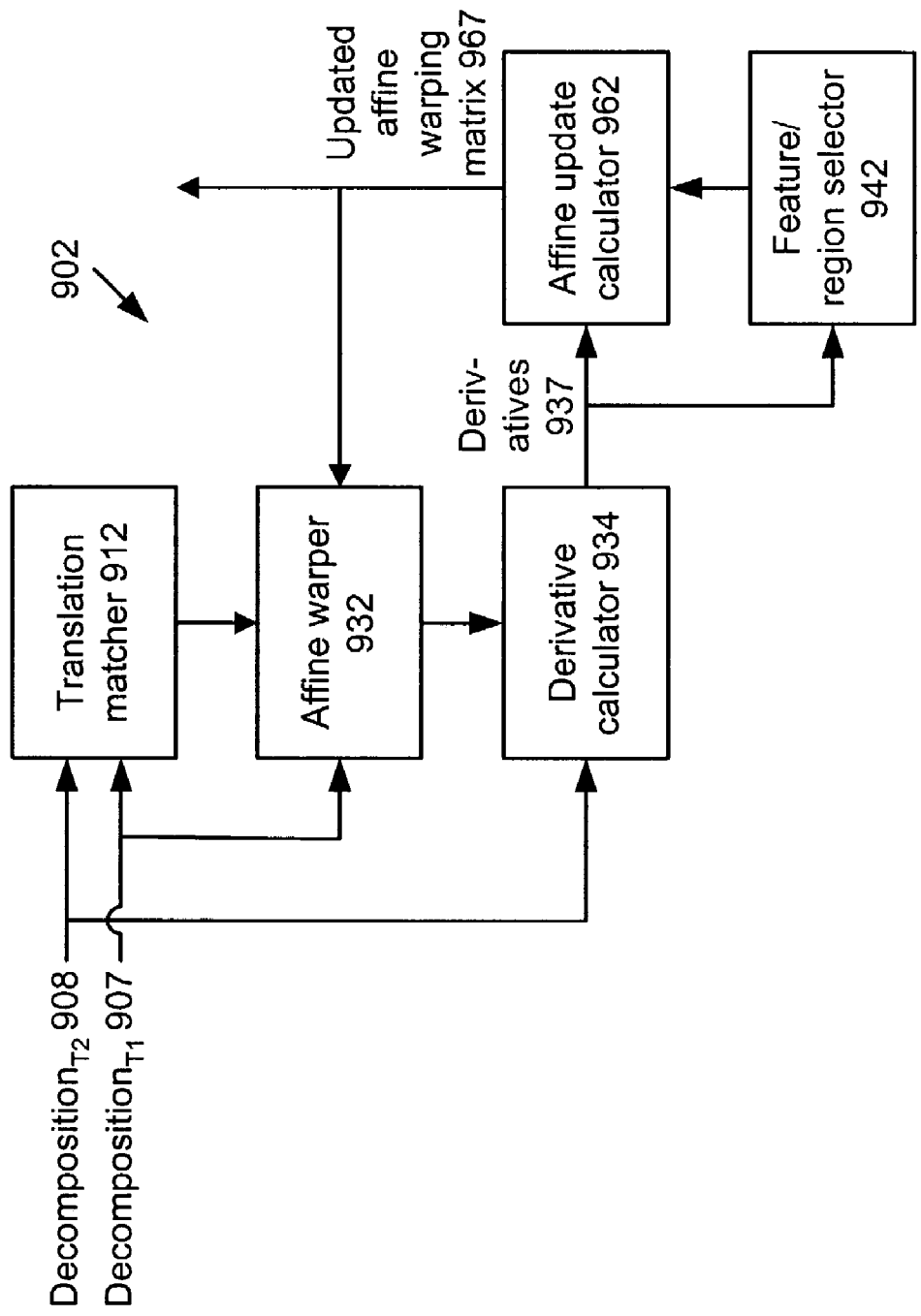
FIG. 9b is a corresponding block diagram showing components of a global motion estimator.

FIG. 9a is a flowchart showing a technique (900) for hierarchical affine motion estimation with selective emphasis of features and/or regions. FIG. 9b is a corresponding block diagram showing components of a global motion estimator (902).

Alternatively, the frame synthesizer uses different techniques to compute affine parameters or uses a different motion model.

C. Estimating Translational Parameters

To start, the translation matcher (912) estimates (910) translational parameters as starting points for the affine warping matrix. Generally, the translation matcher (912) finds a translational match by minimizing the sum of absolute difference errors between a pyramid level n for the frame at time T2 ($L_{T2}$) and globally offset versions of the pyramid level n for the frame at time T1 ($L_{T1}$). The translation matcher (912) finds this match at a fairly coarse pyramid resolution, giving one motion vector for that resolution.

More specifically, to compute the affine warping matrix W, the translation matcher (912) sets the matrix W to the identity matrix and then estimates the translation parameters $w_3$ and $w_6$ by correlation. The translation matcher (912) performs this correlation on pyramid level 2, and the translation parameters are adjusted afterwards by scaling them up by 4, so that W is always defined at the higher resolution of pyramid level 0. The location that minimizes the sum absolute difference error is chosen according to the equation:

$$(w_3 w_6) = \underset{j,k}{\operatorname{argmin}} \left\{ \frac{1}{(ex(j) - sx(j))(ey(k) - sy(k))} \sum_{x=sx(j)}^{ex(j)} \sum_{y=sy(k)}^{ey(k)} |L_{T2}[x, y] - \right. \tag{19}$$

$$\left. L_{T1}[x + j, y + k]| \right\} \text{ where}$$

$$sx(x) = \begin{cases} x \leq 0: B_L - x \\ x > 0: B_L \end{cases}, \tag{20}$$

$$ex(x) = \begin{cases} x \geq 0: B_R - x \\ x < 0: B_R \end{cases}, \tag{21}$$

$$sy(x) = \begin{cases} x \leq 0: B_T - x \\ x > 0: B_T \end{cases}, \text{ and} \tag{22}$$

$$ey(x) = \begin{cases} x \geq 0: B_B - x \\ x < 0: B_b \end{cases}. \tag{23}$$

In these equations, $\{B_L, B_T, B_R, B_B\}$ is the bounding box of the frame at the resolution of pyramid level 2, adjusted by rounding to the nearest pixel. The translation matcher (912) searches the space of (j,k) over the range (−5 ... 5,−3 ... 3) pixels.

Alternatively, the translation matcher (912) uses other and/or additional techniques to estimate translational parameters as a starting point for the affine warping matrix.

D. Refining Translational Parameters

Next, the translation matcher (912) refines (920) the estimated translational parameters, eventually producing one motion vector for the interval. The translation matcher (912) performs global flow analysis using finer pyramid levels. More specifically, the translation matcher (912) performs translational refinement on pyramid level 2, and then on level 1, to obtain a sub-pixel global motion estimate. A warping operator Θ is defined that uses the matrix W to align the two frames by warping $L_{T1}$ towards $L_{T2}$. The translation matcher (912) uses reverse warping such that for any pixel in the resulting warped frame, the warping equation gives the location in $L_{T1}$ from where that pixel value should be obtained. The translation matcher (912) employs bilinear interpolation to allow for sub-pixel accuracy when fetching the pixel from $L_{T1}$. Locations in the warped frame that correspond to regions outside the bounding box of $L_{T1}$ are marked as invalid.

Given $L_{T2}$ and $\Theta L_{T1}$, where Θ is the prior estimate of the warping operator that aligns the two frames, and based on Lucas-Kanade optical flow, the error measure for an additional translational correction is given by:

$$E(\delta u) = \sum_x (\Theta L_{T1} - L_{T2} + \nabla L^T \delta u)^2, \tag{24}$$

where the sum is taken over the intersection of the valid pixels of $\Theta L_{T1}$ and $L_{T2}$. For $L_{T2}$, this consists of pixels within the correct bounding box, and for $\Theta L_{T1}$ this consists of pixels that have been warped from locations inside the bounding box. Minimizing this error with respect to δu leads to the equation:

$$\left[ \sum_x \nabla L \nabla L^T \right] \delta u = -\sum_x \nabla L (\Theta L_{T1} - L_{T2}). \tag{25}$$

To use this equation to obtain an estimate for δu, the translation matcher (912) first uses central differences to obtain the three derivatives centered at the same spatiotemporal location:

$$\delta x = -\Theta L_{T1}[x, y] + \Theta L_{T1}[x + 1, y] - \tag{26}$$
$$\Theta L_{T1}[x, y + 1] + \Theta L_{T1}[x + 1, y + 1] - L_{T2}[x, y] +$$
$$L_{T2}[x + 1, y] - L_{T2}[x, y + 1] + L_{T2}[x + 1, y + 1],$$

$$\delta y = -\Theta L_{T1}[x, y] - \Theta L_{T1}[x + 1, y] + \tag{27}$$
$$\Theta L_{T1}[x, y + 1] + \Theta L_{T1}[x + 1, y + 1] - L_{T2}[x, y] -$$
$$L_{T2}[x + 1, y] + L_{T2}[x, y + 1] + L_{T2}[x + 1, y + 1], \text{ and}$$

$$\delta t = \Theta L_{T1}[x, y] + \Theta L_{T1}[x + 1, y] + \tag{28}$$
$$\Theta L_{T1}[x, y + 1] + \Theta L_{T1}[x + 1, y + 1] - L_{T2}[x, y] -$$
$$L_{T2}[x + 1, y] - L_{T2}[x, y + 1] - L_{T2}[x + 1, y + 1].$$

In essence, a spatial derivative indicates the differences in a particular direction between pixels in a spatial neighborhood. The spatial neighborhood is 2×2 in the equations above. A spatial derivative is located in the middle of the spatial neighborhood. A temporal derivative indicates the differences between pixels in a temporal neighborhood (e.g., 2×2) between frames, and is located halfway between the frames. For each of multiple pixels in space-time (located halfway between pixels in x, y, and t directions), the translation matcher (912) computes δx, δy, and δt. The translation matcher (912) then accumulates these derivatives to form the equation:

$$\begin{bmatrix} \sum_x \delta x^2 & \sum_x \delta x \delta y \\ \sum_x \delta x \delta y & \sum_x \delta y^2 \end{bmatrix} \delta u = \begin{bmatrix} -\sum_x \delta x \delta t \\ -\sum_x \delta y \delta t \end{bmatrix}. \tag{27}$$

The translation matcher (912) solves for δu, taking into account the possibility of degenerate cases. Rewriting the previous equation as Aδu=b, the eigenvalues of A are evaluated according to:

$$\lambda_{1,2} = \frac{1}{2}\left\{Tr\,A \pm \sqrt{(Tr\,A)^2 - 4\,det\,A}\right\}. \quad (28)$$

The translation matcher (912) uses the eigenvalues to solve for δu in the face of cases where the matrix A may be ill-conditioned, which is equivalent to choosing the largest eigenvector to compute a solution when the ratio of the eigenvalues is far from one.

$$\begin{aligned}
&\lambda_1 < \vartheta : \delta u = 0 \\
&\lambda_1 > k\lambda_2 : \{ \\
&\quad |\lambda_1 - A_{00}| < |A_{01}| : \Lambda = \frac{\lambda_1 - A_{00}}{A_{01}}, \delta u = \begin{bmatrix} \frac{b_0 + b_1\Lambda}{\lambda_1(1+\Lambda^2)} \\ \Lambda\frac{b_0 + b_1\Lambda}{\lambda_1(1+\Lambda^2)} \end{bmatrix} \\
&\quad |\lambda_1 - A_{00}| \geq |A_{01}| : \{ \\
&\quad\quad \lambda_1 = A_{00} : \delta u = \begin{bmatrix} b_0/\lambda_1 \\ 0 \end{bmatrix} \\
&\quad\quad \lambda_1 \neq A_{00} : \Lambda = \frac{A_{01}}{\lambda_1 - A_{00}}, \delta u = \begin{bmatrix} \Lambda\frac{b_0\Lambda + b_1}{\lambda_1(1+\Lambda^2)} \\ \frac{b_0\Lambda + b_1}{\lambda_1(1+\Lambda^2)} \end{bmatrix} \\
&\quad \} \\
&\} \\
&\lambda_1 \leq k\lambda_2 : \delta u = A^{-1}b.
\end{aligned} \quad (29)$$

The values of the constants Θ and k are very implementation dependent, and may vary based on various scale factors. For instance, in one implementation, the values are decided based on typical scatter plots of $\lambda_1$ versus $\lambda_2$; and k=8 and Θ=780.

Once a value is obtained for δu, the translation matcher (912) uses it to update the affine warping matrix W:

$$W' = W + \begin{bmatrix} 0 & 0 & \delta u \\ 0 & 0 & 0 \end{bmatrix}. \quad (30)$$

The translation matcher (912) iterates through the refinement process until δu becomes small. Once the iteration converges for pyramid level 2, translation matcher (912) repeats the iteration for pyramid level 1, using the re-scaled warping parameters suitable for this new resolution level.

Alternatively, the translation matcher (912) uses other and/or additional techniques to refine the translational parameters.

E. Estimating and Refining Affine Parameters

In the affine estimation and refinement stage, the global motion estimator (902) computes all the elements of the affine warping matrix W. The components of the global motion estimator (902) compute the elements of the affine warping matrix by iteratively refining the affine parameters so as to converge on the solution for the affine warping matrix W.

First, the translational matcher (912) uses the translational parameters to initialize the six affine parameters. In general, the refinement of the affine parameters proceeds from a coarse pyramid resolution to a fine pyramid resolution and involves a number of iterations at each level. At each iteration, the affine warper (932) warps $L_{T1}$ toward $L_{T2}$ using the current affine parameters. The derivative calculator (934) then computes the spatial and temporal derivatives from co-located pixel information between $\Theta L_{T1}$ and $L_{T2}$ and an incremental update to the affine parameters is computed by the affine update calculator (962). This incremental update is used to update the affine parameters, thereby creating an updated warping matrix to be provided to the affine warper (932) for the next iteration. This process of updating the affine parameters using the incremental update, warping $L_{T1}$ toward $L_{T2}$ using the current, updated affine parameters, and then re-computing an update to the affine parameters continues until the update is small enough or a maximum iteration count has been reached.

1. Calculating Derivatives

More specifically, the global motion estimator (902) seeks to minimize the error given by:

$$E(\delta w) = \sum_x (\Theta L_{T1} - L_{T2} + \nabla L^T J^T \delta w)^2, \quad (31)$$

where δw $\{\delta w_1\ \delta w_2\ \delta w_3\ \delta w_4\ \delta w_5\ \delta w_6\}^T$ is the incremental update of the affine parameters, and J is the Jacobian matrix according to:

$$J = \begin{bmatrix} 1 & \bar{x} & \bar{y} & 0 & 0 & 0 \\ 0 & 0 & 0 & 1 & \bar{x} & \bar{y} \end{bmatrix}^T. \quad (32)$$

In J, $\bar{x}=x+0.5-c_x$ and $\bar{y}=y+0.5-c_y$ are the frame coordinates after moving the origin to the frame center. This centering is done to improve the conditioning of the solution matrix below. The additional constant of 0.5 is added because the derivatives are centered on half pixel boundaries. The error E(δw) is minimized when:

$$\left[\sum_x J\nabla L\nabla L^T J^T\right]\delta w = -\sum_x J\nabla L(\Theta L_{T1} - L_{T2}). \tag{33}$$

So, after the affine warper (932) applies the current affine parameters, the derivative calculator (934) computes the spatial and temporal derivatives from co-located pixel information between $\Theta L_{T1}$ and $L_{T2}$. For example, the derivative calculator (934) uses the definitions of spatial and temporal derivatives shown in equations (26)-(28).

2. Selecting Emphasis

The affine estimation and refinement stage has a number of improvements to increase the speed of the process and to improve its robustness in the case of multiple scene motions. In particular, the feature/region selector (942) selects (940) features and/or regions of the levels to emphasize.

The feature/region selector (942) analyzes the derivatives location by location to determine whether their information should contribute to the affine update. For example, the feature/region selector (942) selectively de-weights locations where the temporal derivative is too large, meaning a large local frame difference, or matching error, is present. In addition, if spatiotemporal derivatives are to be used, the feature/region selector (942) down-weights derivatives coming from near the center of the frame so that they do not contribute so strongly to the global affine update calculation.

In one implementation, the feature/region selector (942) selects points where the absolute value of the time derivative $|\delta t|$ is below a threshold. Points with a low time gradient (i.e., slowly varying points) are more likely than other points to represent the same feature in both frames, and are more likely to contribute meaningfully to the affine update.

The feature/region selector (942) determines the threshold by constructing a histogram of the time derivative and choosing the threshold such that a certain percentage of the pixels will be used and the remainder rejected. For example, the feature/region selector (942) builds a histogram of $\delta t$ on the first affine iteration of each pyramid level. Based on this histogram, the feature/region selector (942) obtains a threshold $\theta_{|\delta t|}$ such that $|\delta t| > \theta_{|\delta t|}$ for an appropriate percentage of pixels in the frame. For instance, 15% is the pre-determined percentage. During successive iterations, those pixels with $\delta t$ values above the threshold are down-weighted before the summation when forming matrix A and vector b. In this way, the fraction (e.g., 15%) of pixels with more deviation in motion will be de-emphasized, compared to the fraction (e.g., 85%) of pixels having less deviation in motion. Down-weighting involves multiplying the derivatives $\delta t$ by a constant such as 0.25.

Instead of or in addition to selecting points based on the time derivative, the feature/region selector (942) may select points where a spatial gradient measure is above a different threshold. One spatial gradient measure is $|\delta x|+|\delta y|$, and the corresponding threshold is $\theta_{|\delta x|+|\delta y|}$. Points with a high spatial gradient are more likely to represent image features such as edges (as opposed to filled regions), and are more likely to contribute meaningfully to the affine update. The feature/region selector (942) determines the spatial gradient threshold by constructing a histogram similar to the one it built for the time derivative, then choosing the threshold such that a certain percentage of the pixels will be used and the remainder rejected. Down-weighting involves multiplying the derivatives $\delta x$ and $\delta y$ by a constant such as 0.25 when the spatial gradient is less than the threshold. In this way, the fraction (e.g., 50%) of pixels with less deviation in space will be de-emphasized, compared to the fraction (e.g., 50%) of pixels having more deviation in space.

Once the feature/region selector (942) chooses appropriate locations, it weights their corresponding derivatives by a factor that is significantly less than one if they are close to the center of the image. This reduces the contribution of motions at the center of the image to the final estimate. For example, for pixels within a centrally placed bounding box of a particular size, the feature/region selector (942) down-weights the derivatives $\delta x$, $\delta y$ and $\delta t$ by a small constant such as 0.5.

Alternatively, other temporal and/or spatial gradient measures are used to distinguish poor locations from good locations in terms of how much useful information they provide in the calculation of the affine update.

3. Calculating the Affine Update

The affine update calculator (962) refines (960) the affine parameters, producing affine updates on each iteration in order to update the affine warping matrix W (967). Specifically, the affine update calculator (962) accumulates the spatiotemporal derivatives, yielding the equation:

$$\left[\sum_x J\begin{bmatrix}\delta x^2 & \delta x\delta y \\ \delta x\delta y & \delta y^2\end{bmatrix}J^T\right]\delta w = -\sum_x J\begin{bmatrix}\delta x\delta t \\ \delta y\delta t\end{bmatrix}. \tag{34}$$

This equation can be written in the form $A\delta w = b$, where A is a 6×6 matrix and b is a 6 element vector. Feature and region selection affects which spatiotemporal derivative data points contribute in the equation. Once the affine update calculator (962) accumulates the valid spatiotemporal derivative data points to form A and b, it solves for $\delta w$ by singular value decomposition of A into $U[\text{diag}(w_i)]V^T$ and uses $$\delta w = V[\text{diag}(1/w_i)](U^T b) \tag{35}.$$

In the process, the affine update calculator (962) sets to zero any $1/w_i$ matrix elements for which $w_i$ is close to zero, so as to handle degenerate cases in the standard way for this kind of problem.

The global motion estimator (902) then uses $\delta w$ to update the warping matrix:

$$W' = W\begin{bmatrix}1 & 0 & c_x \\ 0 & 1 & c_y \\ 0 & 0 & 1\end{bmatrix}\begin{bmatrix}1+\delta w_1 & \delta w_2 & \delta w_3 \\ \delta w_4 & 1+\delta w_5 & \delta w_6 \\ 0 & 0 & 1\end{bmatrix}\begin{bmatrix}1 & 0 & -c_x \\ 0 & 1 & -c_y \\ 0 & 0 & 1\end{bmatrix}. \tag{36}$$

The global motion estimator (902) uses post-multiplication because W is a reverse warping matrix.

The global motion estimator (902) iterates the affine estimation stage on multiple pyramid levels, leading to a progressive refinement of the affine parameters until the base of the pyramid is reached. For example, starting at level 2, the affine estimation stage would be iterated through levels 2, 1, and 0. After the parameters for level n have been obtained, these are scaled and become the starting point for estimating the parameters for the finer level n−1.

In order to increase speed when operating on higher resolution levels of the pyramid, such as levels 0 and 1, the global motion estimator (902) may use an approximation to equation (34), which avoids many floating point operations. In the approximation, the frame is divided into rectangular blocks, and the matrix J is assumed to be constant over these blocks, resulting in the equation:

$$\left[\sum_j J_j \begin{bmatrix} \sum_{x \in blocki} \delta x^2 & \sum_{x \in blocki} \delta x \delta y \\ \sum_{x \in blocki} \delta x \delta y & \sum_{x \in blocki} \delta y^2 \end{bmatrix} J_i^T \right] \delta w = -\sum_i J_i \begin{bmatrix} \sum_{x \in blocki} \delta x \delta t \\ \sum_{x \in blocki} \delta y \delta t \end{bmatrix}, \quad (37)$$

where $J_i$ contains the coordinates of the center of block i. The block size is set to 4×4 for pyramid level 1, and to 8×8 for level 0.

After computing the affine update, the global motion estimator (902) checks (970) whether it can finish the affine refinement stage. For example, the global motion estimator (902) tests for convergence in the affine parameters by comparing δw to a threshold value. If δw is less than the threshold, the affine refinement stage finishes. Otherwise, the affine refinement stage continues. The affine refinement stage may also finish if a maximum number of iterations is reached without convergence in the affine parameters.

F. Checking Quality

Once the affine warping matrix W has been obtained, the global motion estimator (902) evaluates (980) the validity of the matrix to ensure an accurate affine transformation. This is used as an early indication that something is going wrong in the motion estimation.

If the matrix W is deemed invalid, frame interpolation is not used for the current frame interval. Instead, the global motion estimator (902) may use fallback options such as simple weighted averaging of frames or repeating the closest source frame, or it may use no frame synthesis at all.

In one implementation, the matrix is deemed invalid if $w_1 < 0$, $w_5 < 0$, or:

$$\frac{(w_1 w_2 + w_4 w_5)^2}{(w_1^2 + w_4^2)(w_2^2 + w_5^2)} > 0.15^2. \quad (38)$$

The last case checks the amount of affine shearing of the frame to frame transformation. The amount of affine shearing is typically low for real video motion, but becomes high if the content was a missed scene-change or is extremely badly approximated by the affine model.

Alternatively, the global motion estimator (902) performs other and/or additional validity checks, or performs no validity checking at all.

IX. Local Motion Estimation

The frame synthesizer performs local motion estimation to provide localized corrections to the global motion estimation. With the local motion estimation, the frame synthesizer accounts for local motions that deviate from the global motion (e.g., due to occlusions or non-uniform motion), producing a motion field such that individual pixels or blocks of pixels are each given a motion vector. The frame synthesizer may use several refinements to account for occlusions in a source frame.

Generally, the frame synthesizer estimates local motion vectors using coarse-to-fine pyramid-based optical-flow processing. Starting at the lowest-resolution pyramid level, the frame synthesizer estimates a coarse resolution set of motion vectors and uses them to warp the two finer resolution levels from T1 and T2 so that they are closer to being in registration. The frame synthesizer estimates a new set of corrective motion vectors from the registered levels at this resolution, and the process is repeated up to the highest resolution pyramid level. (The highest resolution pyramid level may be ½ or ¼ of the original frame resolution to offset computational complexity.) At a level between the apex and base, the process consists of 1) upsampling the motion vectors from the previous pyramid level; 2) performing warping to register the levels from T1 and T2; 3) computing spatiotemporal derivatives; 4) estimating the correction vectors from the derivatives; and 5) adding the correction onto the upsampled motion vectors.

Figure 10:
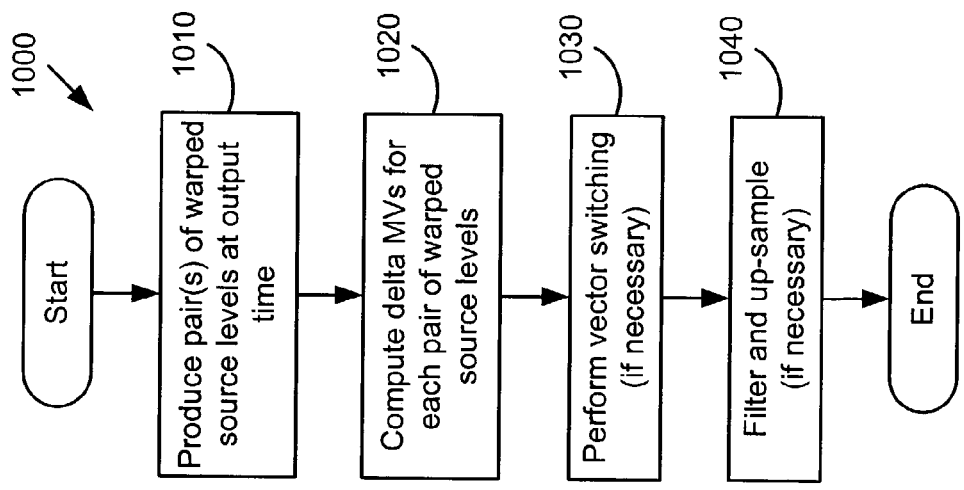
FIG. 10 is a flowchart showing a technique for local motion estimation.

FIG. 10 shows a technique (1000) for local motion estimation with a number of refinements on the basic process. The frame synthesizer performs the technique (1000) at a given pyramid level, and may repeat all or part of it for other pyramid levels. Details of particular stages shown in FIG. 10 in one implementation are given below.

First, the frame synthesizer produces (1010) one or more pairs of warped source levels at the desired output time. The frame synthesizer warps a pyramid level for each of the source frames T1 and T2 towards the intermediate time T1+Δ·T where the output frame will occur. A local motion estimate is then calculated as a correction to the motion transformation at T1+Δ·T. This has the advantage of ensuring the local motion vectors are maintained at the correct spatiotemporal location appropriate for generating the output frame.

When the frame synthesizer produces multiple pairs of warped source levels, the frame synthesizer uses different warping strategies for different pairs. For example, the frame synthesizer uses global affine information to produce one pair, uses the global affine information plus local motion corrections from a coarser level to produce a second pair, and uses an identity matrix on the source levels to produce a third pair. The global affine information is used at different pyramid levels, and the local motion vectors appear as a differential correction to the affine flow field. Alternatively, the frame synthesizer produces only one pair of warped source levels, and the frame synthesizer skips later stages such as vector switching.

Next, the frame synthesizer computes (1020) corrective (or, "delta") motion vectors for each pair of warped source levels. For example, the frame synthesizer derives the delta motion vectors from spatiotemporal derivatives between the pair of warped source levels, and the delta motion vectors are centered at the timestamp of the required output frame.

If multiple pairs of warped source levels were produced, the frame synthesizer performs (1030) vector switching. For example, the frame synthesizer calculates error information and uses it to switch dynamically between different candidate local motion estimates for each pixel. If the frame synthesizer produced (1010) three pairs of warped source levels, the frame synthesizer selects between the three local motion estimates for the three pairs.

Finally, the frame synthesizer filters (1040) the local motion information. For example, the frame synthesizer uses median filtering. If necessary, frame synthesizer upsamples (1040) the local motion information for subsequent use in a finer pyramid level. After performing local motion estimation on the pyramid base, the frame synthesizer uses the output local motion estimates to synthesize the output frame.

Alternatively, the frame synthesizer uses other local motion estimation techniques, for example, one-pass (not coarse-to-fine) techniques, techniques using a different motion model, or techniques that produce a field of motion vectors rather than delta motion vectors. Or, instead of producing a motion field with one vector per point/block, the frame synthesizer may produce another kind of motion field.

Figure 11A:
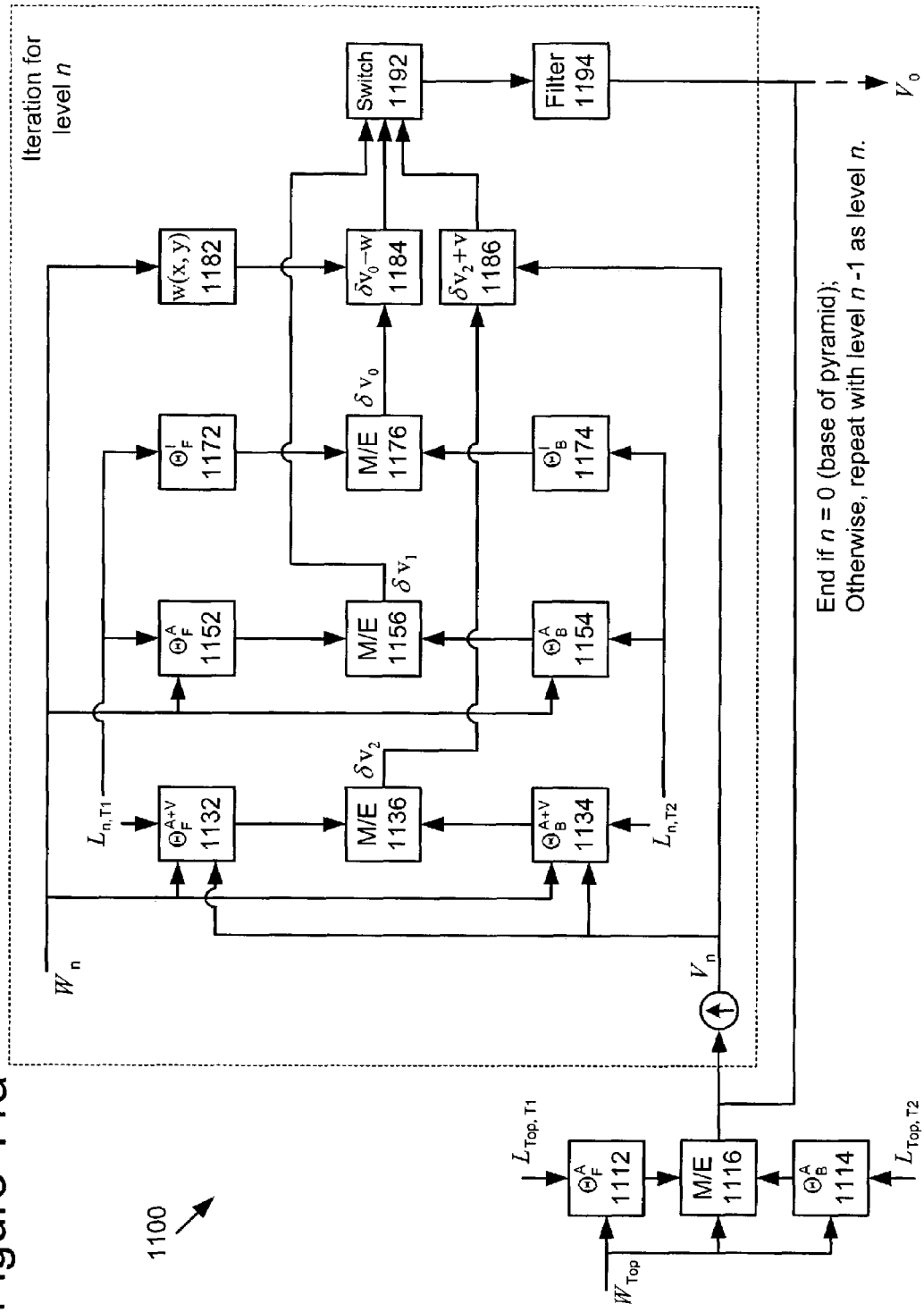
FIG. 11a is a block diagram showing warping, delta motion vector calculation, vector switching, and filtering in local motion estimation.
Figure 11B:
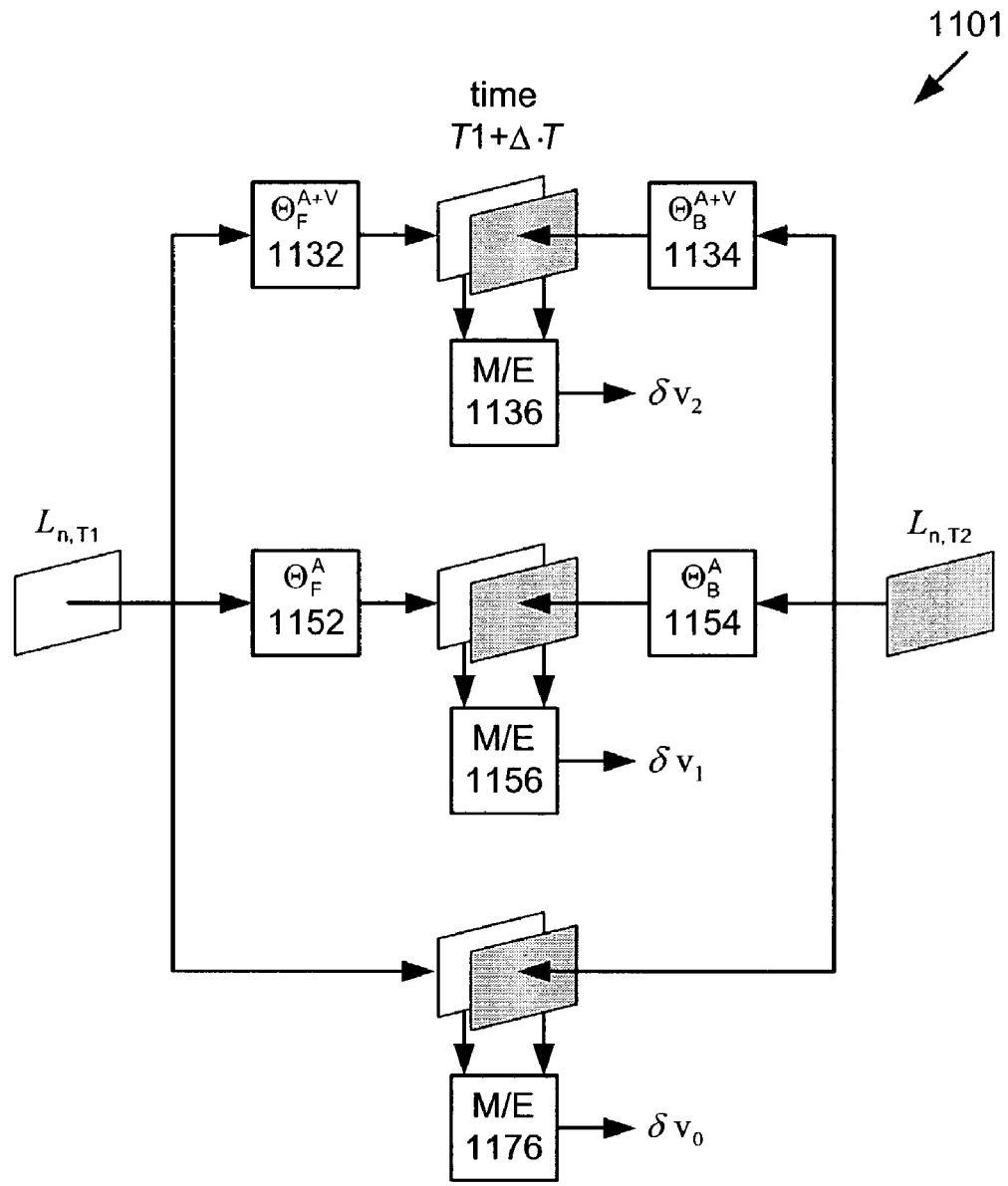
FIG. 11b is a block diagram detailing the warping at a single pyramid level.

FIGS. 11*a* and 11*b* show local motion estimation in one implementation, which includes warping, calculation of delta motion vectors, vector switching, filtering, and upsampling in a coarse-to-fine refinement of local motion estimates. Whereas FIG. 11a shows components for each of these stages and relations for iterative processing, FIG. 11b details warping at a single pyramid level in the local motion estimation.

With reference to FIG. 11a, the frame synthesizer uses bi-directional warping to obtain vectors at time $T1+\Delta \cdot T$. The vectors are initialized at the top level of the pyramid by affine warping and estimating the vector field at the lowest resolution. This field is upsampled to provide the input for iterative estimation at finer levels, in which the vectors are refined. Given the affine parameters for level n and the vectors from level n+1, the frame synthesizer estimates the new vectors for level n. The frame synthesizer repeats this process for each level of the pyramid until vectors at the base resolution are obtained. These are not upsampled further, but instead are used directly for rendering in subsequent motion compensated temporal filtering.

A. Warping

FIG. 11a shows local motion estimation that produces a motion field in which each point is given a corrective motion vector. The corrective motion vectors are located at the proper position and time so that the frame synthesizer can construct the output frame simply. The overall motion information associates pixels in the future frame (at T2) with corresponding pixels in the past frame (at T1), however, the corrective motion vectors are located such that they are at the correct points where pixel information must be placed in the output frame.

FIGS. 11a and 11b show how the candidate pairs are formed. Overall, the frame synthesizer warps pyramid data from times T1 and T2 towards the output timestamp by three methods, and these warped levels are used as a starting point for differential motion estimation. The frame synthesizer warps pixel data from a specific pyramid level at time T1 forward to time $T1+\Delta \cdot T$ and from T2 backward, also to time $T1+\Delta \cdot T$. The frame synthesizer generates pairs of warped levels using different forms of warping. FIGS. 11a and 11b show these warps with the operators $\Theta$.

For the first pair, the frame synthesizer uses only the affine model, including the operators $\Theta_F^A$ (1152) and $\Theta_B^A$ (1154). The frame synthesizer applies the forward, affine-only operator $\Theta_F^A$ (1152) to $L_{T1}$, and it applies the backward, affine-only operator $\Theta_B^A$ (1154) to $L_{T2}$. This results in two warped levels that are aligned only in a global sense.

First, the frame synthesizer scales the affine parameters to the output timestamp. Given the warping matrix W (with translations $w_3$ and $w_6$ scaled appropriately for the current pyramid level), the frame synthesizer generates scaled forward and backward warping matrices $W_F$ and $W_B$ according to:

$$W_F = \begin{bmatrix} \Delta & 0 & 0 \\ 0 & \Delta & 0 \\ 0 & 0 & 1 \end{bmatrix} W + \begin{bmatrix} 1-\Delta & 0 & 0 \\ 0 & 1-\Delta & 0 \\ 0 & 0 & 0 \end{bmatrix}, \text{ and} \quad (39)$$

$$W_B = \begin{bmatrix} 1-\Delta & 0 & 0 \\ 0 & 1-\Delta & 0 \\ 0 & 0 & 1 \end{bmatrix} W^{-1} + \begin{bmatrix} \Delta & 0 & 0 \\ 0 & \Delta & 0 \\ 0 & 0 & 0 \end{bmatrix}. \quad (40)$$

From these, the frame synthesizer defines the affine warping operator $\Theta_F^A$ (1152), which reverse warps in the forward direction from time T1 to $T1+\Delta \cdot T$, as:

$$\Theta_F^A L_{T1}(x,y) = L_{T1}\langle W_F[x\ y\ 1]^T \rangle. \quad (41)$$

The frame synthesizer defines the affine warping operator $\Theta_B^A$ (1154), which reverse warps in the backwards direction from time T2 to $T1+\Delta \cdot T$, as:

$$\Theta_B^A L_{T2}(x,y) = L_{T2}\langle W_B[x\ y\ 1]^T \rangle. \quad (42)$$

L<x> is a bilinear interpolator which gives the interpolated pixel value from sub-pixel location x in L. If the location is outside the bounding box of the source frame, then the returned pixel value is marked as invalid.

For the second pair, the frame synthesizer combines the affine transformation with local motion offsets in the operators $\Theta_F^{A+V}$ (1132) and $\Theta_B^{A+V}$ (1134). Thus, the frame synthesizer generates an additional pair of warped levels that are aligned locally.

The frame synthesizer defines warping operators that include both an affine component and a corrective component from the motion vector field v(x,y) inherited from computations on the previous, coarser pyramid level. The motion vectors from level n+1 are upsampled to the same resolution as level n. Along with suitable scaling, these are then combined with vector fields computed from the affine parameters. Like the affine warping matrix, the motion vector correction is scaled according to the time of the output frame. This leads to the following equations for the "affine+vector" warping operators $\Theta_F^{A+V}$ (1132) and $\Theta_B^{A+V}$ (1134):

$$\Theta_F^{A+V} L_{T1}(x,y) = L_{T1}\left\langle W_F[x\ y\ 1]^T + \begin{bmatrix} \Delta \cdot v(x,y) \\ 0 \end{bmatrix} \right\rangle, \text{ and} \quad (43)$$

$$\Theta_B^{A+V} L_{T2}(x,y) = L_{T2}\left\langle W_B[x\ y\ 1]^T + \begin{bmatrix} (\Delta-1) \cdot v(x,y) \\ 0 \end{bmatrix} \right\rangle. \quad (44)$$

Again, the frame synthesizer uses bilinear interpolation and marks as invalid all pixels that come from regions outside the bounding box of the source frame.

In addition to these two forms of warping, the frame synthesizer uses the original un-warped levels from T1 and T2 as a candidate pairs for differential motion estimation (shown as the identity operators $\Theta_F^I$ (1172) and $\Theta_B^I$ (1174) in FIG. 11a). The frame synthesizer defines the identity warping operators $\Theta_F^I$ (1172) and $\Theta_B^I$ (1174) as:

$$\Theta_F^I L_{T1}(x,y) = L_{T1}(x,y) \quad (45), \text{ and}$$

$$\Theta_B^I L_{T2}(x,y) = L_{T2}(x,y) \quad (46).$$

For all these warping operators, the frame synthesizer deals with invalid pixels by replacing them by a pixel value obtained by symmetrical extension.

Alternatively, the frame synthesizer uses other and/or additional techniques to warp source levels.

B. Obtaining Delta Motion Vectors

The frame synthesizer next computes differential motion vectors, starting with spatial and temporal derivatives. The temporal derivatives are centered halfway in time between the two warped references. (For the no-warp case, the differential motion estimation uses the pyramid levels directly.) The frame synthesizer computes three sets of delta motion vectors, starting from the three candidate level pairs: affine, affine plus motion vector field, and no warp.

FIGS. 11a and 11b show three different motion estimations (1136, 1156, 1176) that produce delta motion vectors. In fact, for each set of delta motion vectors, the frame synthesizer may use a modified version of Equation (25) (still including the optical flow constraint) to compute the local corrective motion vector field $\delta v(x,y)$. It uses a 5×5 window S centered at the location (x,y) for each vector computation. The frame synthesizer calculates the derivatives according to the following equations:

$$\delta x = -\Theta_F L_{T1}[x, y] + \Theta_F L_{T1}[x+1, y] - \Theta_F L_{T1}[x, y+1] + \Theta_F L_{T1}[x+1, y+1] - \quad (47)$$
$$\Theta_B L_{T2}[x, y] + \Theta_B L_{T2}[x+1, y] - \Theta_B L_{T2}[x, y+1] + \Theta_B L_{T2}[x+1, y+1],$$

$$\delta y = -\Theta_F L_{T1}[x, y] - \Theta_F L_{T1}[x+1, y] + \Theta_F L_{T1}[x, y+1] + \Theta_F L_{T1}[x+1, y+1] - \quad (48)$$
$$\Theta_B L_{T2}[x, y] + \Theta_B L_{T2}[x+1, y] + \Theta_B L_{T2}[x, y+1] + \Theta_B L_{T2}[x+1, y+1], \text{ and}$$

$$\delta t = -\Theta_F L_{T1}[x, y] - \Theta_F L_{T1}[x+1, y] - \Theta_F L_{T1}[x, y+1] - \Theta_F L_{T1}[x+1, y+1] + \quad (49)$$
$$\Theta_B L_{T2}[x, y] + \Theta_B L_{T2}[x+1, y] + \Theta_B L_{T2}[x, y+1] + \Theta_B L_{T2}[x+1, y+1].$$

In these equations, $\Theta_F$ and $\Theta_B$ are the appropriate warping operators for the warping strategy (e.g., affine, affine plus motion vector field, or no warp).

The frame synthesizer determines the delta motion vectors by solving the equation:

$$\begin{bmatrix} \sum_{x \in S} \delta x^2 & \sum_{x \in S} \delta x \delta y \\ \sum_{x \in S} \delta x \delta y & \sum_{x \in S} \delta y^2 \end{bmatrix} \delta v(x, y) = \begin{bmatrix} -\sum_{x \in S} \delta x \delta t \\ -\sum_{x \in S} \delta y \delta t \end{bmatrix}. \quad (50)$$

The frame synthesizer solves this equation for $\delta v$ at each location using the eigenvalue method used to obtain $\delta u$, as described in the section on global motion estimation.

Due to the use of a 5×5 window, the frame synthesizer spatially pads out the warped levels prior to the derivative calculation. The frame synthesizer uses symmetrical padding and extends the levels by 2 pixels at each border. Also., the derivatives are centered at the middle of a 2×2 pixel square and, for this reason, there will be one less motion vector than source point in the horizontal or vertical directions. This half pixel displacement of the sampling lattice is compensated for in later computations.

In addition to computing the motion vector field, the frame synthesizer also computes an error for each motion vector. This is given by:

$$E_{\delta v}(x, y) = \sum_{X \in S} \left( \delta v(x, y) \cdot \begin{bmatrix} \delta x \\ \delta y \end{bmatrix} + \delta t \right)^2, \quad (51)$$

where $\delta v$ is constant over the summation, x and y are used as separate variables which are constants under the sum, and $\delta x$, $\delta y$ and $\delta t$ are functions of the vector X. The vector X is the position coordinate for the derivatives, and this varies under the sum in eq. 51 (i.e., the derivatives $\delta x$, $\delta y$ and $\delta t$ are spatially dependent).

Alternatively, the frame synthesizer uses other and/or additional techniques to compute corrective motion vectors.

C. Vector Switching

The frame synthesizer performs vector switching to select between the motion information of the different candidate motion fields. Vector switching is advantageous to local motion estimation because it allows refinement of motion information at progressively finer resolutions, and yet allows the process to recover from possibly poor motion estimates inherited from coarser resolution levels. This helps the frame synthesizer address occlusions, new objects, and non-uniform motion in the video sequence.

Figure 12:
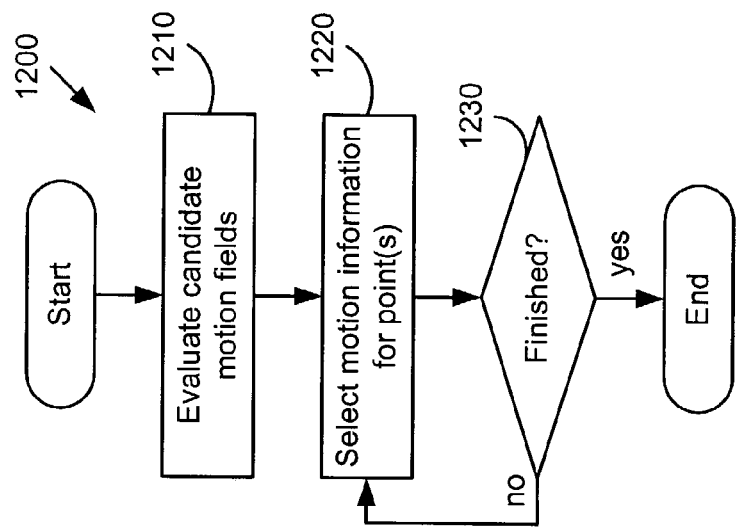
FIG. 12 is a flowchart showing a technique for vector switching.

FIG. 12 shows a generalized technique (1200) for vector switching in which the frame synthesizer selects between motion information from two or more candidate motion fields on a point-by-point or other basis. The motion information is, for example, delta motion vectors that correct global motion information (as described above), absolute motion vectors, or information according to some other motion model.

To start, the frame synthesizer evaluates (1210) candidate motion fields. For example, the frame synthesizer computes error measures for delta motion vectors in candidate fields, as described above.

The frame synthesizer then selects (1220) motion information for one or more points. For example, the frame synthesizer selects motion information on a point-by-point basis in the candidate fields or at some other basis such as block-by-block. In addition, the motion information for a given point may be information for a particular pixel or block in a level or frame.

The frame synthesizer determines (1230) whether the vector switching process is finished for the candidate fields or not. If not, the frame synthesizer selects (1220) motion information for the next one or more points. The frame synthesizer may also perform the evaluation (1210) within the iteration loop.

Returning to FIGS. 11a and 11b, at this point, the frame synthesizer produces (1186) a candidate motion field representing an update to the affine flow plus the motion field upsampled from level n+1. The frame synthesizer uses the update to the affine flow (after motion estimation (1156)) as another candidate motion field. For the third candidate motion field, the frame synthesizer determines (1182) the effect of the affine warping matrix and produces (1184) an update to the stationary flow (zero flow). Different fields have different advantages. For example, while the affine-only and affine+vector fields benefit from previous motion estimation, they can lead to spatial spreading of vectors across object boundaries, leading to visible artifacts in the output frame.

The frame synthesizer performs vector switching (1192) to choose between the three candidate delta motion vector fields. The frame synthesizer thus obtains a new motion vector field v'(x,y) that is a correction to the affine flow implicitly defined by W. The frame synthesizer switches (1192) based on the error measure of equation (51).

At each point in the field, it chooses a delta motion vector from one of these update flows such that the error criterion is minimized. For given point, the frame synthesizer compares the error measure $E_{\delta v}^I(x,y)$ for the delta motion vector obtained from the zero-warp frames, the error measure $E_{\delta v}^A$ (x,y) for the delta motion vector obtained from the affine warped frames, and the error measure $E_{\delta v'}^{A+V}(x,y)$ for the delta motion vector obtained from the frames warped by the affine transformation modified by corrective motion vectors.

If $E_{\delta v'}^{I}(x,y) \leq E_{\delta v'}^{A+V}(x,y)$ and $E_{\delta v'}^{I}(x,y) \leq E_{\delta v'}^{A}(x,y)$, then the frame synthesizer will use the delta motion vector obtained from the zero-warp frames for the point. The frame synthesizer computes the zero-motion offset of the affine field, and then obtains the final vector by adjusting the zero-warp vector to cancel out the effect of W:

$$v'(x,y) = \delta v(x,y) + \begin{bmatrix} 1 & 0 & 0 \\ 0 & 1 & 0 \end{bmatrix} W \begin{bmatrix} x+0.5 \\ y+0.5 \\ 1 \end{bmatrix} - \begin{bmatrix} x+0.5 \\ y+0.5 \end{bmatrix}. \quad (52)$$

If $E_{\delta v'}^{A}(x,y) \leq E_{\delta v'}^{A+V}(x,y)$ and $E_{\delta v'}^{A}(x,y) < E_{\delta v'}^{I}(x,y)$, then the frame synthesizer uses the delta motion vector obtained from the affine warped frames.

$$v'(x,y) = \delta v(x,y) \quad (53).$$

If $E_{\delta v'}^{A+V}(x,y) < E_{\delta v'}^{A}(x,y)$ and $E_{\delta v'}^{A+V}(x,y) < E_{\delta v'}^{I}(x,y)$, then the frame synthesizer will use the delta motion vector obtained from the frames warped by the affine transformation modified by the inherited corrective motion vectors. The final corrective motion vector is:

$$v'(x,y) = \delta v(x,y) + 0.25[v(x,y) + v(x+1,y) + v(x,y+1) + v(x+1,y+1)] \quad (54).$$

The averaging operation shifts the locations of the vectors in v(x,y) (which are frame pixel center aligned) onto the locations of the delta motion vectors (which are half pixel offset).

Alternatively, the frame synthesizer uses different switching logic or switches based upon other and/or additional criteria.

D. Filtering and Upsampling

After vector switching, the frame synthesizer applies a filter (1194) to the new vectors for level n. If the base of the pyramid has been reached (i.e., n=0), the frame synthesizer has finished the local motion estimation and outputs a vector for each block of pixels (e.g., a 2×2 or 4×4 block depending on frame size). Otherwise, the frame synthesizer upsamples the vectors so that they can be used for warping at the resolution of level n−1.

The frame synthesizer employs two different filters. For level 0, the frame synthesizer uses a linear smoothing filter. The 3×3 smoothing operation is defined by:

$$v''(x,y) = [4v'(x,y) + v'(x-1,y) + v'(x+1,y) + v'(x,y-1) + v'(x,y+1)]/8 \quad (55).$$

For other levels, a 3×3 median filter is used. The computation in the median filter is defined by:

$$v''(x,y) = \mathrm{median}\begin{pmatrix} v'(x-1,y-1), v'(x,y-1), v'(x+1,y-1), \\ v'(x-1,y), v'(x,y), v'(x+1,y), \\ v'(x-1,y+1), v'(x,y+1), v'(x+1,y+1) \end{pmatrix}, \quad (56)$$

where the vector x and y components are processed independently by the median operator. In both median and smoothing operations, if a vector cannot be computed because its spatial neighborhood contains locations outside the field, the frame synthesizer copies from v'(x,y) to v''(x,y) without alteration.

Alternatively, the frame synthesizer applies other and/or addition filters, or skips filtering.

The frame synthesizer uses upsampling to convert the vector field v'(x,y) at level n into a warping field v(x,y) for level n−1. The upsampling also changes the pixel alignment of the motion vectors to move them from half pixel offset locations at level n to center pixel locations at level n−1. The upsampling is defined by the equation $$v_{n-1}(x,y) = 2 \sum_{\substack{j=x-2 \\ j\,\mathrm{even}}}^{x} \sum_{\substack{k=y-2 \\ k\,\mathrm{even}}}^{y} v''_n\left(R_{clipx}\left(\frac{j}{2}\right), R_{clipy}\left(\frac{k}{2}\right)\right) f[x-j]f[y-k], \quad (57)$$

where:

$$R_{clip}(x) = \begin{cases} x < 0: 0 \\ 0 \leq x < N-1: x \\ x \geq N-1: N-2 \end{cases} \quad (58)$$

and $f[x] = \{1,2,1\}/2$ is the filter kernel. N is either the width or height of the Laplacian level n, as appropriate. The factor of 2 in the upsampling equation scales the length of the vectors to match the new resolution. Also, the clipping takes into account the fact that v''(x,y) has one less element at the right/bottom edge than its associated pixel data.

If the base pyramid level has resolution comparable to the source frames, the frame synthesizer computes a vector for each pixel rather than for each 2×2 or 4×4 block of the source frames. This provides higher resolution motion at the cost of computational complexity.

E. Checking Quality

At various points in the local motion estimation, the frame synthesizer may check the quality of the local motion estimates to ascertain if the subjective quality will be good enough for display. The frame synthesizer computes a quality measure for the local motion estimates, and if the quality measure indicates quality is sufficient, the frame synthesis process continues normally. Otherwise, the frame synthesizer skips frame synthesis or performs a fall back procedure such as simple weighted averaging of source frames.

One quality measure is the variance of the differential motion vectors, which rises rapidly during scenes that cause interpolation or motion estimation problems. This is because the variance gives an indication of the difference in motion from place to place in the scene. The interpolation algorithm gets progressively worse as motion departs from the affine field and becomes more chaotic.

The frame synthesizer calculates the variance for the delta vector set used to provide the warping at the start of the calculations for pyramid level 0. Alternatively, the frame synthesizer calculates the variance at the end of the iteration for that level, or at the beginning and/or end of the iterations for other levels. The frame synthesizer calculates motion variance according to:

$$V = \frac{1}{N} \sum_{x,y} v(x,y) \cdot v(x,y) - \frac{1}{N^2} \sum_{x,y} v(x,y) \cdot \sum_{x,y} v(x,y). \quad (59)$$

If the variance falls outside a threshold, then the frame synthesizer skips frame synthesis or uses a fallback mode for the frame interval. In one implementation, the frame synthesizer uses the fallback mode when $V > 1200^2$.

Alternatively, the frame synthesizer uses other and/or additional error measures.

X. Motion Compensated Temporal Filtering

Once the frame synthesizer obtains the global motion information (e.g., affine warp matrix W) and the local motion information (e.g., delta vectors) at the timestamp $T1+\Delta \cdot T$ of the output frame, the frame synthesizer synthesizes the frame at full resolution. The motion compensated temporal filtering includes stages of warping and interpolation (with error concealment). The frame synthesizer warps the frame at time $T1$ forward and warps the frame at time $T2$ backwards. The warped frames are then combined using rules that help prevent the appearance of artifacts relating to mismatch.

Figure 13:
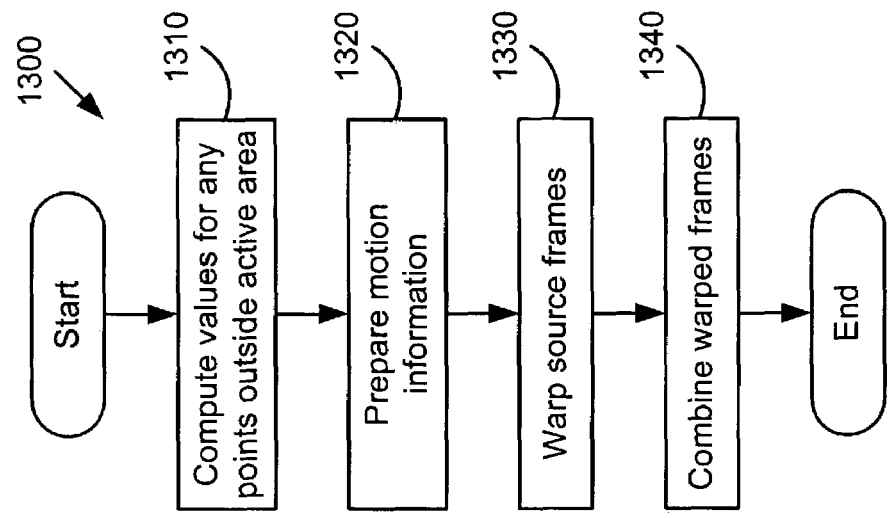
FIG. 13 is a flowchart showing a technique for motion compensated temporal filtering.

FIG. 13 shows a technique (1300) for motion compensated temporal filtering. The technique has multiple stages, including computing values for points in border areas, preparing the motion information, warping the source frames, and combining the warped frames. Alternatively, the frame synthesizer uses other motion compensated temporal filtering techniques in frame synthesis.

A. Computing Values for Points in Border Areas

The frame synthesizer computes (1310) values for points in border areas, if necessary. The border areas are areas outside of the active area of the frame, for example, as detected by a window detection technique and defined by a bounding box. When pixels are part of 'letterbox' rectangular borders in a source sequence, the pixels are not likely to contain meaningful content or content that requires motion analysis. If there are no border areas, the frame synthesizer continues to the next stage.

In one implementation, for destination pixels outside of a bounding box, the frame synthesizer computes the output pixels by linear interpolation as follows:

$$Y(x,y) = (1-\Delta) \cdot Y_{T1}(x,y) + \Delta \cdot Y_{T2}(x,y) \quad (60),$$

$$U(x,y) = (1-\Delta) \cdot U_{T1}(x,y) + \Delta \cdot U_{T2}(x,y) \quad (61), \text{ and}$$

$$V(x,y) = (1-\Delta) \cdot V_{T1}(x,y) + \Delta \cdot V_{T2}(x,y) \quad (62).$$

The frame synthesizer uses similar operations to generate the luma (Y) component outside a luma bounding box and the chroma (UV) components outside a chroma bounding box. The chroma components are at half luminance resolution in 4:2:0 video. The frame synthesizer does not use motion compensation at this stage.

Alternatively, the frame synthesizer uses other and/or additional techniques to compute (1310) values for points in border areas, if necessary.

B. Preparing Motion Information

The frame synthesizer prepares (1320) the motion information for use in the frame synthesis. The preparation involves creating forward and backward warping matrices to apply to the source frames. In addition, the preparation may involve adjusting the motion information to scale for use in the frame synthesis, if necessary. The global motion estimate (e.g., affine warping matrix) and/or the local motion estimates (e.g., delta vectors) may require adjustment to the resolution of the output frames before warping the source frames.

In one implementation, the frame synthesizer adjusts the delta vectors to correspond to the resolution of the output frame, if necessary. In some cases, the delta vectors are computed at a spatial resolution that is a factor (e.g., 2 or 4) smaller than the resolution of the source frame in each dimension. If multiplied by this factor, the size of the pyramid base will typically be larger than the source frames due to padding. Therefore, the frame synthesizer corrects locations for the delta motion vector field and updates the warping matrix to reflect the change in coordinate system. The frame synthesizer generates the warping matrix W for rendering by scaling the coefficients $w_3$ and $w_6$ up by a factor of 2 or 4 from their values at the pyramid base, so that the warp is appropriate for the final output resolution.

The frame synthesizer then generates forward and backward warp matrices WF and WB for warping towards time $T1+\Delta \cdot T$ according to equations (39) and (40). If the source image is 2 times larger (in each dimension) than the pyramid base, then the frame synthesizer scales the motion vectors by a factor of 2 and upsamples the vectors by a factor of 2. For example, the frame synthesizer simply replicates the vector for each 2×2 neighborhood, which does not normally lead to artifacts. The resulting warping operators are defined by:

$$\Theta_F^{A+V} Y_{T1}(x, y) = \qquad (63)$$
$$Y_{T1}\left\langle W_F[x \ y \ 1]^T + \begin{bmatrix} 2\Delta \cdot v(\text{floor}(x/2), \text{floor}(y/2)) \\ 0 \end{bmatrix} \right\rangle,$$

$$\Theta_B^{A+V} Y_{T2}(x, y) = \qquad (64)$$
$$Y_{T2}\left\langle W_B[x \ y \ 1]^T + \begin{bmatrix} 2(\Delta-1) \cdot v(\text{floor}(x/2), \text{floor}(y/2)) \\ 0 \end{bmatrix} \right\rangle,$$

$$\Theta_F^{A+V} U_{T1}(x, y) = U_{T1}\left\langle W_F[x \ y \ 1]^T + \begin{bmatrix} \Delta \cdot v(x, y) \\ 0 \end{bmatrix} \right\rangle, \text{ and} \qquad (65)$$

$$\Theta_B^{A+V} U_{T2}(x, y) = U_{T2}\left\langle W_B[x \ y \ 1]^T + \begin{bmatrix} (\Delta-1) \cdot v(x, y) \\ 0 \end{bmatrix} \right\rangle, \qquad (66)$$

where the angle brackets indicate bilinear interpolation from the associated pixel field. The V chroma component warping operators can be the same as the corresponding U operators.

If the upsampling factor is 4 in each dimension, the vector field is upsampled by a factor of 2 in each dimension:

$$v_{\uparrow 2}(x, y) = \qquad (67)$$
$$2 \sum_{\substack{j=x-1 \\ j \text{ even}}}^{x+1} \sum_{\substack{k=y-1 \\ k \text{ even}}}^{y+1} v\left(R_{clipx}\left(\frac{j}{2}\right), R_{clipy}\left(\frac{k}{2}\right)\right) f[x-j+1] f[y-k+1],$$

where $f[x]$ and $R_{clip}(x)$ are defined above. Then, the upsampled vector field is used in equations (63) through (66), substituting $v_{\uparrow 2}(x,y)$ for $v(x,y)$. In effect, this results in upsampling by 2 once more in each dimension.

Alternatively, the frame synthesizer uses other and/or additional techniques to prepare (1320) the motion information for use in the frame synthesis.

C. Warping the Source Frames and Combining the Warped Frames

The frame synthesizer then warps (1330) the source frames and combines (1340) the warped source frames. Specifically, using the motion information (e.g., affine parameters as well as delta vectors), the frame synthesizer warps (1330) the source frame at time T1 forward to time $T1+\Delta \cdot T$ and warps the source frame at time T2 backward to time $T1+\Delta \cdot T$. When the warps are complete, the frame synthesizer combines (1340) data from the warped frames to create the intermediate frame at time $T1+\Delta \cdot T$.

1. Overview: Reducing Ghosting Artifacts

Simple averaging of data from the warped frames for points in the output frame can result in ghosting artifacts. This occurs, for example, if the motion vector back to the frame at time T1 references a pixel for a foreground object therein, but the motion vector forward to the frame at time T2 references to a pixel in the background in that frame. Averaging the two referenced pixels, when repeated for neighboring points in the intermediate frame, produces a ghostly outline of the foreground object. Instead, the points in the intermediate frame should take the values of either the foreground object pixels from the frame at time T1 or the background pixels from the frame at time T2.

Figure 14:
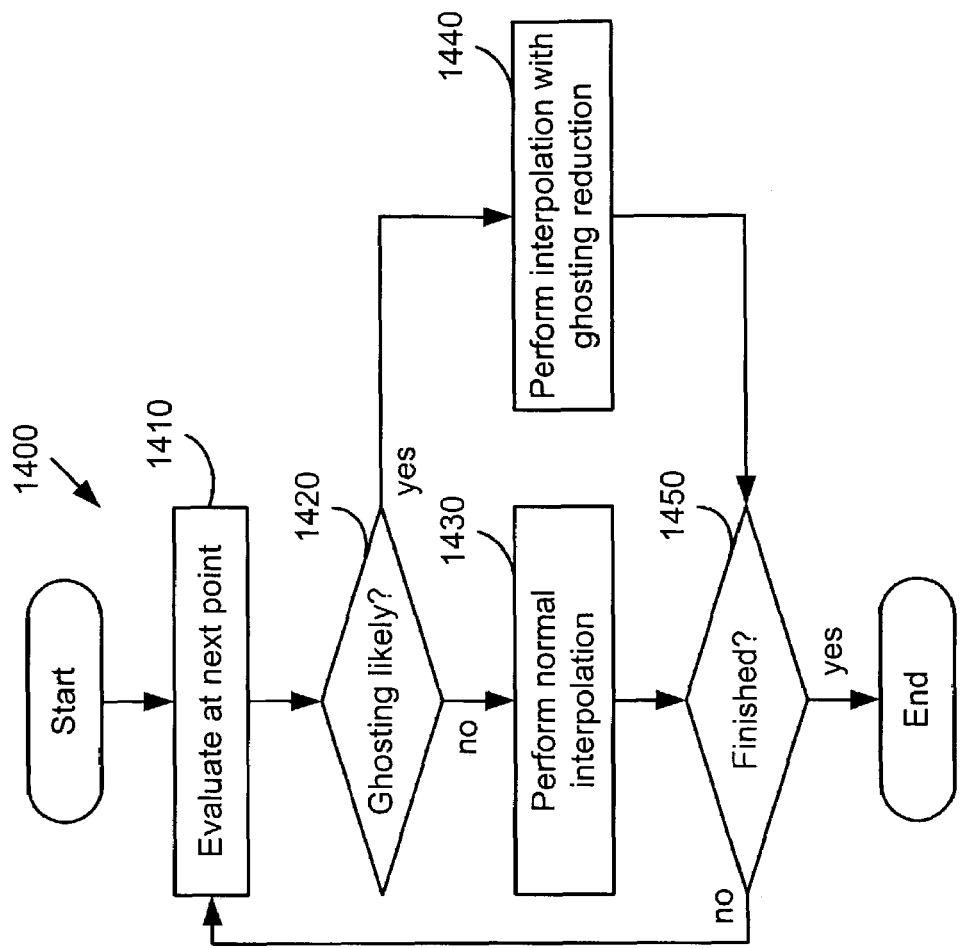
FIG. 14 is a flowchart showing a technique for reducing ghosting artifacts.

FIG. 14 shows a technique (1400) for reducing ghosting artifacts. The frame synthesizer performs the technique (1400) when combining pixel data from two frames (e.g., warped source frames, non-warped source frames) for points in an intermediate frame.

The frame synthesizer evaluates (1410) the next point in the intermediate frame. For example, the frame synthesizer computes an error measure (here, difference d) between the co-located pixels of a forward-warped source frame and a backward-warped source frame.

$$d=|\Theta_F^{A+V}F_{T1}(x,y)-\Theta_B^{A+V}F_{T2}(x,y)| \quad (68).$$

The frame synthesizer then determines (1420) if ghosting is likely in the intermediate frame. For example, the frame synthesizer compares the difference d to one or more threshold values, or it computes a ghosting reduction factor from d as follows:

$$\sigma=(d-\theta_0)/(\theta_1-\theta_0) \quad (69),$$

where the frame synthesizer then saturates the reduction factor such that it is clamped to the range 0 to 1, inclusive.

If ghosting is not likely, the frame synthesizer performs (1430) normal interpolation for the point. For example, the frame synthesizer averages the pixels from the forward-warped source frame and the backward-warped source frame.

Otherwise, the frame synthesizer performs (1440) interpolation with ghosting reduction. For example, the frame synthesizer computes the output value for the point in a way that favors (or completely relies on) the source frame closer in time to the intermediate frame. One equation for such interpolation is:

$$F(x,y)=\sigma \cdot U+(1-\sigma)\cdot((1-\Delta)\cdot\Theta_F^{A+V}F_{T1}(x,y)-\Delta\cdot\Theta_B^{A+V}F_{T2}(x,y)) \quad (70),$$

where U is the forward warped frame if $\Delta<0.5$, and otherwise U is the backward warped frame.

The frame synthesizer then determines (1450) whether to finish (e.g., when the end of the intermediate frame is reached) or continue by evaluating (1410) the next point in the intermediate frame.

Alternatively, the frame synthesizer computes another error measure, uses other and/or additional criteria for determining when to switch interpolation modes, and/or uses different interpolation modes. Moreover, although FIG. 14 shows iteration and evaluation on a point-by-point basis in the intermediate frame, alternatively, the frame synthesizer evaluates points in the intermediate frame on some other basis.

2. Overview: Feathering

Aside from ghosting artifacts, frame synthesis may result in other artifacts along the seams between areas of the intermediate frame. This occurs, for example, if values for points in one area in the intermediate frame come from an averaging of two warped source frames, but values for points in an adjacent area come from just one of the warped source frames. The seam dividing the two areas in the intermediate frame may show due to an abrupt change in luminance on the respective sides of the seam. Instead, the points leading up to the seam should take values that make the transition between the areas more gradual.

Figure 15:
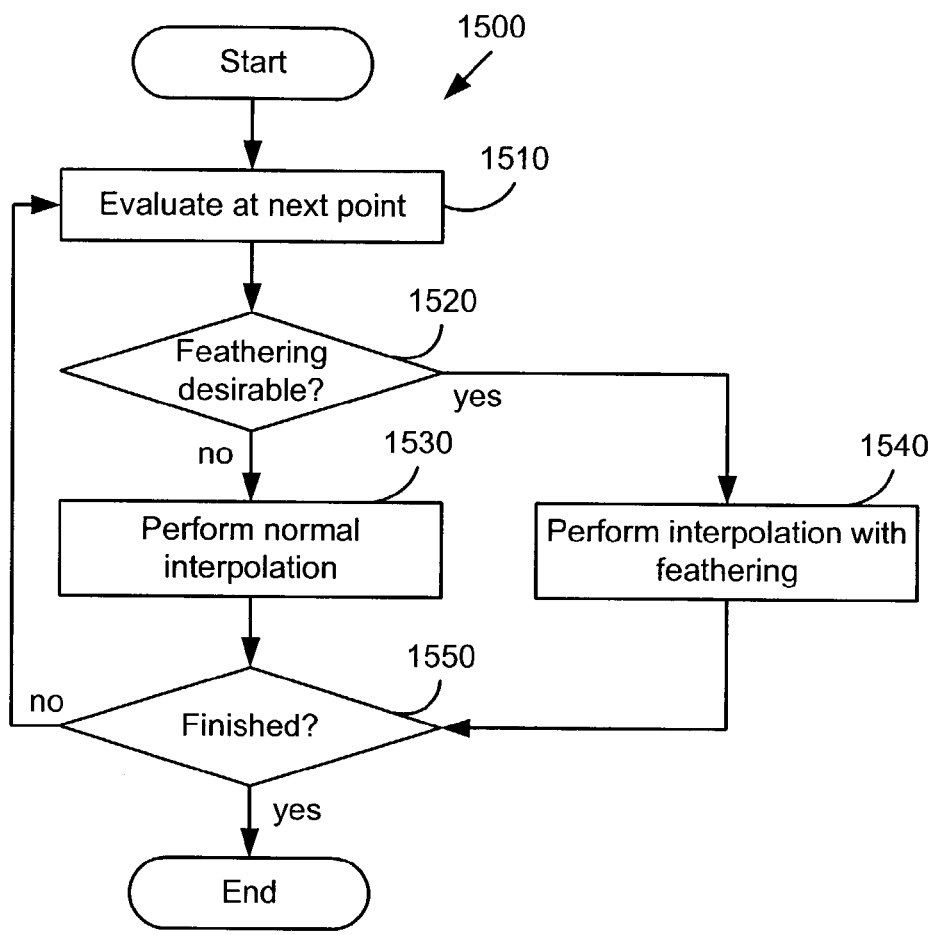
FIG. 15 is a flowchart showing a technique for feathering to reduce boundary artifacts.

FIG. 15 shows a technique (1500) for feathering to reduce this kind of artifact. The frame synthesizer performs the technique (1500) when combining pixel data from two frames (e.g., warped source frames, non-warped source frames) for points in an intermediate frame.

The frame synthesizer evaluates (1510) the next point in the intermediate frame and determines (1520) if feathering is desirable. For example, the frame synthesizer checks the proximity of the corresponding points in warped source frames to the edges of the warped source frames. If corresponding point is close to the edge in a forward-warped source frame, but the corresponding point is not close to the edge in a backward-warped source frame, the frame synthesizer increases the weight given to pixel data from the backward-warped source frame, in anticipation of a transition to the exclusive use of pixel data from the backward-warped source frame.

If feathering is not desirable, the frame synthesizer performs (1530) normal interpolation for the point. For example, the frame synthesizer averages the pixels from the forward-warped source frame and the backward-warped source frame.

Otherwise, the frame synthesizer performs (1540) interpolation with feathering. For example, the frame synthesizer computes the output value for the point in a way that smoothes an anticipated transition between areas of the intermediate frame.

The frame synthesizer then determines (1550) whether to finish (e.g., when the end of the intermediate frame is reached) or continue by evaluating (1510) the next point in the intermediate frame.

Alternatively, the frame synthesizer uses other and/or additional criteria for determining when to switch interpolation modes, and/or uses different interpolation modes. Moreover, although FIG. 15 shows iteration and evaluation on a point-by-point basis in the intermediate frame, alternatively, the frame synthesizer evaluates points in the intermediate frame on some other basis.

3. Interpolation with Feathering and Ghosting Reduction

Figures 16, 17A:
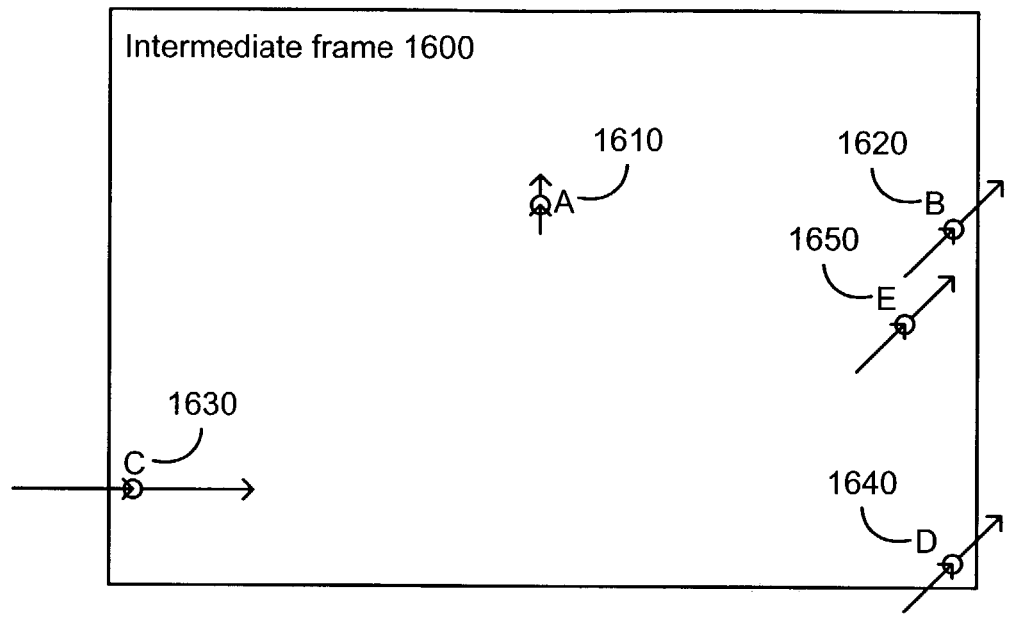

A frame synthesizer may perform motion compensated temporal filtering with both feathering and ghosting reduction. FIGS. 17a, 17b, 18, 19, and 20 show pseudocode for one such implementation. To illustrate the implementation with respect to points in an intermediate frame, FIG. 16 shows an intermediate frame (1600) in which points have different combinations of valid and invalid reference pixels.

In this implementation, to compute an intermediate frame, the frame synthesizer combines pixel data from warped source frames using a local, per-pixel rule that helps prevent the appearance of artifacts relating to mismatch. The pixels in the warped source frames do not necessarily have values and therefore are not necessarily valid—motion may point to a location outside the reference frame. The frame synthesizer combines what pixels are available to cover the entire output frame, if possible. FIG. 16 shows five points in the intermediate frame (1600), corresponding to five different combinations of valid/invalid reference pixels.

For pixels in the intermediate frame (1600) where there are two valid source pixel values (coming from the forward- and backward-warped references, respectively), the frame synthesizer performs a filtering process to obtain the output pixel value. At point A (1610), for example, the pixel in the intermediate frame (1600) comes from both forward- and backward-warped frames.

For pixels in the intermediate frame (1600) where there is only one valid source pixel, the output pixel value is set to the pixel value from one warped source frame or the other. At point B (1620), for example, the pixel comes from only the forward-warped frame (since the reference pixel for the backward-warped frame is out of bounds and, hence, invalid). On the other hand, at point C (1630), the pixel comes from only the backward-warped frame (since the reference pixel for the forward-warped frame is out of bounds and, hence, invalid).

For pixels in the intermediate frame (1600) where there is no valid source pixel, the frame synthesizer uses some other method to generate the output pixel value. At point D (1640), for example, the pixel comes from neither the forward-warped frame nor the backward-warped frame (since the reference pixels are out of bounds, and hence invalid). The frame synthesizer may pad one or both of the warped source frames, or use the non-warped source frames, as the basis for the output pixel value.

Although FIG. 16 shows the outline of the intermediate frame (1600), the determination of whether reference pixels are valid or invalid may instead be made with reference to the bounding box around an active area, when an intermediate frame has been partitioned into an active area and border area.

FIG. 17*a* is a pseudocode listing (1700) showing the decision process of the frame synthesizer for the luma component. The frame synthesizer determines if the pixel data from both the forward-warped frame and the backward-warped frame are valid (e.g., within the bounding box or frame, if there is no bounding box). If so, the routine MERGE_Y_WITH_FEATHER( ) is invoked, which combines pixel data from the warped reference frames. Otherwise, the frame synthesizer determines if only the pixel data from the forward-warped frame is valid. If so, the pixel data from the forward-warped frame is used as the luma component of the output pixel. Otherwise, the frame synthesizer determines if only the pixel data from the backward-warped frame is valid. If so, the pixel data from the backward-warped frame is used as the luma component of the output pixel. Otherwise, the routine MERGE_Y_FALLBACK ( ) is invoked.

FIG. 17*b* is corresponding pseudocode listing (1701) for the chroma component. The frame synthesizer checks the validity of the reference pixels for one of the chroma components, and produces the chroma component of the output pixel accordingly.

The frame synthesizer uses feathering to reduce artifacts at the edges of regions where the forward and backward-warped frames are combined. Feathering reduces the contribution from one source as a transition is approached. Thus, the feathering produces a smoother blending of pixels from forward and backward-warped frames. With reference to FIG. 16, for example, at point E (1650), the pixel in the intermediate frame (1600) comes from both forward- and backward-warped frames, but it is close to the transition area after which pixels will come from only the forward-warped frame (e.g., point B (1620)). Thus, the frame synthesizer uses feathering when computing the output value for point E (1650), giving more weight to pixel data from the forward-warped frame in anticipation of the transition. Feathering in this fashion gives a smoother appearance to the intermediate frame (1600) between points E (1650) and B (1620).

In addition to feathering, the frame synthesizer blends pixel data from the forward- and backward-warped frames using a non-linear filter. If pixel values from the two sources are similar (i.e., small difference), the non-linear filter blends the pixel values fairly evenly. On the other hand, if the pixel values from the two sources are not similar (i.e., large difference), the non-linear filter favors one pixel value or the other, depending on the temporal proximity of the intermediate frame to the respective source frames. In essence, the non-linear filter favors (or uses exclusively) pixel data from the source frame closest to the intermediate frame. In this manner, the frame synthesizer accounts for many instances of occlusions and newly exposed objects between the frames, since such events typically result in dissimilar pixel data from the warped reference frames. The frame synthesizer reduces ghosting artifacts by favoring one source frame or the other.

FIG. 18 shows a pseudocode listing (1800) for the routine MERGE_Y_WITH_FEATHERING( ). The routine includes both feathering and non-linear blending. The values of the thresholds in the routine depend on implementation. For example, possible values are $\theta_L=15$ and $\theta_U=40$. The variable $\alpha$ is a "merge factor," and the variable q is a "feathering factor." When $\alpha=0.5$ and $q=0.5$, then $m=0.5$ and the pixel data from the forward- and backward-warped frames are merged with equal weight.

The merge factor $\alpha$ changes depending on the value of $\Delta$ and on the similarity of the pixel values from the forward- and backward-warped frames. If the pixel values are similar (i.e., their difference is below the low threshold $\theta_L$), then the merge factor depends only on $\Delta$, which is the normalized interpolation time. If the pixel values are very different (i.e., their difference is greater than the high threshold $\theta_H$), then the merge factor is set such that it selects only pixels from either the forward- or the backward-warped frame, depending on whether $\Delta \leq 0.5$ or $\Delta > 0.5$, respectively.

The feather factor q controls what happens near the edges of the warped frames. Values less than 0.5 favor the forward-warped frame, and values larger than 0.5 favor the backward-warped frame. The frame synthesizer derives the feather factor using the sub-pixel locations $(x_F, y_F)$ and $(x_B, y_B)$ of the pixel in each reference frame. FIG. 19 shows a pseudocode listing (1900) for deriving the feather factor The variables L, T, R, B define the bounding box in the reference frame.

When both forward and backward reference pixel locations are invalid (e.g., fall outside the frame or the bounding box), the frame synthesizer uses a fallback routine to obtain the pixel for the intermediate frame. FIG. 20 shows a pseudocode listing (2000) for the routine MERGE_Y_FALLBACK( ). In essence, the routine uses simple averaging if the difference in pixel data between the reference frames is small. Otherwise, the routine uses a relatively simple non-linear filtering. Alternatively, the frame synthesizer derives the output pixels from unwarped source frames at times T1 and T2.

For the U and V components, the frame synthesizer performs similar processes. The routine MERGE UV( ), for example, computes a weighted sum of the warped source frames:

$$U(x,y)=(1-\Delta+\beta)\Theta_F^{A+V}U_{T1}(x,y)+(\Delta-\beta)\Theta_B^{A+V}U_{T2}(x,y) \qquad (71), \text{ and}$$

$$V(x,y)=(1-\Delta+\beta)\Theta_F^{A+V}V_{T1}(x,y)+(\Delta-\beta)\Theta_B^{A+V}V_{T2}(x,y) \qquad (72),$$

where the frame synthesizer derives the parameter $\beta$ from intermediate results of the luma interpolation stage. The value of $\beta$, used for combining the chroma components at any one spatial location, is obtained from the values $\beta_i$ for the four co-located luma components according to:

$$\beta = \frac{\beta_1 + \beta_2 + \beta_3 + \beta_4}{4}. \qquad (73)$$

The frame synthesizer also has a fallback option for the U and V components. The routine MERGE_UV_FALLBACK( ), for example, follows the equations:

$$U(x,y)=(1-\Delta+\beta)U_{T1}(x,y)+(\Delta-\beta)U_{T2}(x,y) \qquad (74), \text{ and}$$

$$V(x,y)=(1-\Delta+\beta)V_{T1}(x,y)+(\Delta-\beta)V_{T2}(x,y) \qquad (75),$$

in which the source frame components are not warped.

Alternatively, the frame synthesizer performs other and/or additional techniques when warping the source frames and/or combining the warped source frames. For example, the frame synthesizer uses one of the quality enhancement techniques described in U.S. patent application Ser. No. 10/186,562, filed Jun. 28, 2002, hereby incorporated by reference.

XI. Results

Frame synthesis with motion compensated temporal interpolation, as outlined in FIG. 4b and subsequently described in detail, has several advantages relative to previous techniques such as temporal interpolation without motion compensation. Primarily, it provides better subjective and PSNR improvements. Quality estimation helps to ensure that a consistent quality level is met, preventing the viewer from being subjected to annoying artifacts. Also, the frame synthesis runs in real-time.

Tables 1 and 2 compare the results of simple frame averaging and motion compensated temporal interpolation. The results are in terms of perceptual signal to noise ratio ["PSNR"] for a group of standard QCIF-size video sequences.

TABLE 1

Conversion from 15 fps to 30 fps

| Sequence | Simple Frame Averaging | Motion Compensated Temporal Interpolation |
|---|---|---|
| Foreman | 33.75 | 36.02 |
| Akiyo | 49.19 | 47.67 |
| Bream | 30.29 | 32.91 |
| Mobile | 32.44 | 30.08 |
| Stefan | 21.68 | 28.27 |
| Mother | 43.79 | 44.54 |
| Children | 28.71 | 30.47 |
| Coastguard | 31.41 | 36.29 |

In the case of 15 fps source sequences converted to 30 fps, the largest gains (of the order of 3 dB) are obtained for the high-motion sequences. These also show significant subjective improvements, even for extreme inter-frame displacements. Frame averaging tends to produce ghosting artifacts, whereas frame interpolation creates a crisp output frame, even when motion is quite extreme. Interpolation gives a lower average PSNR for some of the low-motion sequences. This is because of the blurring that is introduced by bilinear interpolation during sub-pixel motion compensation. It is especially apparent on the sequence "Mobile" because this sequence has a lot of detailed texture.

TABLE 2

Conversion from 10 fps to 30 fps

| Sequence | Simple Frame Averaging | Motion Compensated Temporal Interpolation |
|---|---|---|
| Foreman | 30.94 | 33.79 |
| Akiyo | 46.61 | 46.51 |
| Bream | 28.19 | 31.15 |
| Mobile | 28.96 | 29.84 |
| Stefan | 20.66 | 26.56 |
| Mother | 41.84 | 42.86 |
| Children | 27.25 | 28.91 |

In the case of 10 fps source sequences converted to 30 fps, the gains are even more impressive. Frame averaging suffers from temporal aliasing and is unable to do a good job for such large inter-frame intervals. For this reason, the loss seen on the sequence "Mobile" in the 15 to 30 fps conversion becomes a 1 dB gain.

The frame synthesis outlined in FIG. 4b (and subsequently described in detail) has been extensively optimized and runs real-time alongside video decoding at 15fps input rate on a P3-500 MHz machine for QCIF sequences. It also runs real-time on a P4-1 GHz machine for CIF size sequences.

It should be understood that the programs processes, or methods described herein are not related or limited to any particular type of computing environment, unless indicated otherwise. Various types of general purpose or specialized computing environments may be used with or perform operations in according with the teachings described herein. Elements of embodiments shown in software may be implemented in hardware and vice versa.

In view of the many possible embodiments to which the principles of our invention may be applied, we claim as our invention all such embodiments as may come within the scope and the spirit of the following claims and equivalents thereto.

We claim:

1. A method comprising:
receiving a pair of source video frames in a video sequence;
determining whether frame synthesis with motion analysis is on, wherein scene change detection indicates whether the frame synthesis with motion analysis is on;
if the frame synthesis with motion analysis is on, synthesizing pixel values for an intermediate video frame between the source video frames using frame interpolation with motion analysis, wherein frame interpolation with motion analysis includes global motion estimation,
otherwise, synthesizing pixel values for the intermediate video frame using a fallback mode or skipping synthesis of the intermediate video frame; and
providing the source video frames and the intermediate video frame, if any, for display.

2. The method of claim 1 wherein the fallback mode comprises simple averaging of pixel values of the source video frames.

3. The method of claim 1 wherein the fallback mode comprises using only pixel values of a selected one of the source video frames.

4. The method of claim 1 wherein one or more bits in a bitstream signal whether the frame synthesis with motion analysis is on or off.

5. The method of claim 4 wherein the one or more bits are at frame level.

6. The method of claim 4 wherein the one or more bits are at sequence level.

7. The method of claim 4 wherein the one or more bits also signal a count of intermediate video frames between the source video frames.

8. The method of claim 1 wherein quality control measurement indicates whether the frame synthesis with motion analysis is on or off.

9. The method of claim 8 wherein a playback device performs the quality control measurement.

10. The method of claim 8 wherein the quality control measurement is based at least in part on results of the global motion estimation.

11. The method of claim 8 wherein the quality control measurement is based at least in part on results of local motion estimation.

12. The method of claim 1 wherein, for the frame synthesis with motion analysis, the synthesizing includes on a pixelby-pixel basis determining valid pixels in motion compensated versions of the source video frames.

13. The method of claim 1 wherein, for the frame synthesis with motion analysis, the synthesizing includes feathering.

14. The method of claim 1 wherein, for the frame synthesis with motion analysis, the synthesizing includes ghosting reduction.

15. The method of claim 1 wherein, for the frame synthesis with motion analysis, the synthesizing includes:
   detecting an active window;
   using the frame interpolation with motion analysis for pixels in the active window; and
   using another technique for pixels outside the active window.

16. The method of claim 1 wherein the determining whether frame synthesis with motion analysis is on occurs before the receiving the pair of source video frames.

17. The method of claim 1 wherein the determining whether frame synthesis with motion analysis is on occurs after the receiving the pair of source video frames.

18. The method of claim 1 wherein the frame interpolation with motion analysis includes producing a global warping matrix.

19. The method of claim 18 wherein the global warping matrix is an affine matrix.

20. A computer-readable medium storing computer-executable instructions comprising code for:
   receiving one or more bits in a bitstream, wherein the one or more bits signal whether frame synthesis is on or off;
   if frame synthesis is on, determining whether frame synthesis with motion analysis is on, wherein scene change detection indicates whether the frame synthesis with motion analysis is on; and
   if the frame synthesis with motion analysis is on, synthesizing one or more output frames between source frames using a normal mode, wherein the normal mode comprises frame interpolation with motion analysis including global motion estimation,
   otherwise, synthesizing the one or more output frames using a fallback mode or skipping synthesis of the one or more output frames.

21. The computer-readable medium of claim 20 wherein the one or more bits are at frame level in the bitstream.

22. The computer-readable medium of claim 20 wherein the one or more bits are at sequence level in the bitstream.

23. The computer-readable medium of claim 20 wherein the one or more bits also signal a count of output frames between the source frames.

24. The computer-readable medium of claim 20 wherein the frame interpolation with motion analysis further includes local motion estimation to correct the global motion estimation.

25. A computer-readable medium storing computer-executable instructions comprising code for:
   receiving a pair of source video frames in a video sequence;
   determining whether frame synthesis with motion analysis is on, wherein scene change detection indicates whether the frame synthesis with motion analysis is on; and
   synthesizing pixel values for an intermediate video frame between the source video frames using frame interpolation with motion analysis if the frame synthesis with motion analysis is on, wherein the frame interpolation with motion analysis includes global motion estimation,
   otherwise, synthesizing pixel values for the intermediate video frame using a fallback mode or skipping synthesis of the intermediate video frame.

26. The computer-readable medium of claim 25 wherein the fallback mode comprises simple averaging of pixel values of the source video frames.

27. The computer-readable medium of claim 25 wherein the fallback mode comprises using only pixel values of a selected one of the source video frames.

28. The computer-readable medium of claim 25 wherein one or more bits in a bitstream signal whether the frame synthesis with motion analysis is on.

29. The computer-readable medium of claim 28 wherein the one or more bits are at frame level.

30. The computer-readable medium of claim 28 wherein the one or more bits are at sequence level.

31. The computer-readable medium of claim 28 wherein the one or more bits also signal a count of intermediate video frames between the source video frames.

32. The computer-readable medium of claim 25 wherein quality control measurement indicates whether the frame synthesis with motion analysis is on.

33. The computer-readable medium of claim 32 wherein a playback device performs the quality control measurement.

34. The computer-readable medium of claim 32 wherein the quality control measurement is based at least in part on results of the global motion estimation.

35. The computer-readable medium of claim 32 wherein the quality control measurement is based at least in part on results of local motion estimation.

36. The computer-readable medium of claim 25 wherein, for the frame synthesis with motion analysis, the synthesizing includes on a pixel-by-pixel basis determining valid pixels in motion compensated versions of the source video frames.

37. The computer-readable medium of claim 25 wherein, for the frame synthesis with motion analysis, the synthesizing includes feathering.

38. The computer-readable medium of claim 25 wherein, for the frame synthesis with motion analysis, the synthesizing includes ghosting reduction.

39. The computer-readable medium of claim 25 wherein, for the frame synthesis with motion analysis, the synthesizing includes:
   detecting an active window;
   using the frame interpolation with motion analysis for pixels in the active window; and
   using another technique for pixels outside the active window.

40. The computer-readable medium of claim 25 wherein the frame interpolation with motion analysis includes producing a global warping matrix.

41. The computer-readable medium of claim 40 wherein the global warping matrix is an affine matrix.

42. The computer-readable medium of claim 25 wherein the frame interpolation with motion analysis further includes correcting the global motion estimation with local motion estimation.

43. A computer-readable medium storing computer-executable instructions comprising code for:
   receiving a pair of source video frames in a video sequence;
   determining whether frame synthesis with motion analysis is on, wherein scene change detection indicates whether the frame synthesis with motion analysis is on; and
   synthesizing pixel values for an intermediate video frame between the source video frames using frame interpolation with motion analysis if the frame synthesis with motion analysis is on,
   otherwise, synthesizing pixel values for the intermediate video frame using a fallback mode or skipping synthesis of the intermediate video frame.

44. The computer-readable medium of claim 43 wherein the fallback mode comprises simple averaging of pixel values of the source video frames.

45. The computer-readable medium of claim 43 wherein the fallback mode comprises using only pixel values of a selected one of the source video frames.

46. The computer-readable medium of claim 43 wherein one or more bits in a bitstream signal whether the frame synthesis with motion analysis is on.

47. The computer-readable medium of claim 43 wherein, for the frame synthesis with motion analysis, the synthesizing includes on a pixel-by-pixel basis determining valid pixels in motion compensated versions of the source video frames.

48. The computer-readable medium of claim 43 wherein, for the frame synthesis with motion analysis, the synthesizing includes feathering.

49. The computer-readable medium of claim 43 wherein, for the frame synthesis with motion analysis, the synthesizing includes ghosting reduction.

50. The computer-readable medium of claim 43 wherein, for the frame synthesis with motion analysis, the synthesizing includes:

detecting an active window;

using the frame interpolation with motion analysis for pixels in the active window; and using another technique for pixels outside the active window.

* * * * *